(12) United States Patent
Nomura et al.

(10) Patent No.: US 7,872,810 B2
(45) Date of Patent: Jan. 18, 2011

(54) LIGHT SHIELDING STRUCTURE OF AN OPTICAL DEVICE

(75) Inventors: Hiroshi Nomura, Saitama (JP); Kazunori Ishizuka, Kanagawa (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/396,839

(22) Filed: Mar. 3, 2009

(65) Prior Publication Data

US 2009/0225460 A1     Sep. 10, 2009

(30) Foreign Application Priority Data

Mar. 6, 2008     (JP)     ............... 2008-055799

(51) Int. Cl.
*G02B 15/14*     (2006.01)

(52) U.S. Cl. .................................. 359/704

(58) Field of Classification Search ............... 359/611, 359/612, 704, 738
See application file for complete search history.

(56) References Cited

U.S. PATENT DOCUMENTS

| | | | |
|---|---|---|---|
| 6,024,457 A | 2/2000 | Kawai et al. | |
| 7,625,140 B2 * | 12/2009 | Miya | ............. 396/349 |
| 2004/0070849 A1 | 4/2004 | Tanaka | |
| 2004/0156181 A1 | 8/2004 | Nomura et al. | |
| 2006/0034595 A1 | 2/2006 | Yamazaki et al. | |
| 2007/0127910 A1 | 6/2007 | Miya | |
| 2007/0269204 A1 | 11/2007 | Miya et al. | |

FOREIGN PATENT DOCUMENTS

JP     2007-183685     7/2007

OTHER PUBLICATIONS

U.S. Appl. No. 12/369,161 to Nomura et al., filed Feb. 11, 2009.
U.S. Appl. No. 12/369,194 to Nomura et al., filed Feb. 11, 2009.
U.S. Appl. No. 12/369,231 to Nomura et al., filed Feb. 11, 2009.

* cited by examiner

*Primary Examiner*—Joseph Martinez
(74) *Attorney, Agent, or Firm*—Greenblum & Bernstein, P.L.C.

(57) ABSTRACT

A light shielding structure of an optical device includes outer and inner annular members which move relative to each other in an axial direction, small and large diameter outer peripheral portions formed on the inner annular member, and a light shielding ring positioned inside the outer annular member and supported thereby. The light shielding ring does not contact the small-diameter outer peripheral portion of the inner annular member. The light shielding ring and the large-diameter outer peripheral portion of the inner annular member coincide with each other in the axial direction in an operating state of the optical device whereby a clearance between the outer annular member and the inner annular member is made light-tight. The light shielding ring and the small-diameter outer peripheral portion of the inner annular member coincide with each other in the axial direction in a non-operating state of the optical device.

18 Claims, 11 Drawing Sheets

LIGHT SHIELDING STRUCTURE OF AN OPTICAL DEVICE

BACKGROUND OF THE INVENTION

1. Field of the Invention

The present invention relates to a light shielding structure of an optical device such as a lens barrel having two annular members which move relative to each other in an axial direction.

2. Description of the Related Art

Optical devices, especially lens barrels which move between a retracted state (non-operating state) and a ready-to-photograph state (operating state) are usually provided with a number of annular members which move relative to one another in an axial direction. The lens barrel must be provided, between two annular members among the number of annular members which serve as exterior members of the lens barrel, with some sort of light shielding structure. This sort of light shielding structure is disclosed in, e.g., Japanese Unexamined Patent Publication 2007-183685.

This light shielding structure has been formerly designed based on a design principle of simply filling a clearance between two annular members with a light shielding member (e.g., light shielding paper, fabric or Mylar). However, a sliding frictional resistance (contact resistance) occurs due to the light shielding member when the two annular members move relative to each other. It is desirable to reduce such sliding frictional resistance between the light shielding member and the annular members as much as possible in order to reduce the load on relative movement between the two annular members. In addition, since sliding frictional resistance continuously occurs during relative movement between the two annular members, there is a possibility of fine scuffs being made on a periphery of the annular member which is in sliding contact with the light shielding member.

SUMMARY OF THE INVENTION

The present invention provides a light shielding structure between two annular members which move relative to each other in an axial direction, wherein the light shielding structure is configured so that sliding frictional resistance does not continuously occur during relative movement between the two annular members, which minimizes the possibility of fine scuffs being made on a periphery of the annular member which is in sliding contact with the light shielding member.

The present invention has been devised based on a viewpoint that a clearance between the two annular members must be made light-tight only when the two annular members are in an operating state of an optical device in which the two annular members are fully extended relative to each other, namely, a clearance between the two annular members does not always need to be made light-tight.

According to an aspect of the present invention, a light shielding structure of an optical device is provided, including an outer annular member and an inner annular member which move relative to each other in an axial direction, the outer annular member being concentrically positioned outside the inner annular member; a small-diameter outer peripheral portion and a large-diameter outer peripheral portion which are formed on the inner annular member at different positions to each other in the axial direction, the large-diameter outer peripheral portion being greater in diameter than the small-diameter outer peripheral portion; and a light shielding ring positioned inside the outer annular member and supported thereby, wherein the light shielding ring does not contact at least the small-diameter outer peripheral portion of the inner annular member. Positions of the light shielding ring and the large-diameter outer peripheral portion of the inner annular member coincide with each other in the axial direction in an operating state of the optical device whereby a clearance between the outer annular member and the inner annular member is made light-tight. Positions of the light shielding ring and the small-diameter outer peripheral portion of the inner annular member coincide with each other in the axial direction in a non-operating state of the optical device in which the clearance does not need to be made light-tight.

Since the light shielding structure between the inner and outer annular members is configured so that the light shielding ring that is supported inside the outer annular member is positioned to correspond (coincide) to the large-diameter outer peripheral portion of the inner annular member to make a clearance between the inner and outer annular members light-tight in an operating state in which the clearance is to be made light-tight and so that the light shielding ring is not in contact with the small-diameter outer peripheral portion of the inner annular member in an non-operating state, sliding frictional resistance does not continuously occur during relative movement between the two annular members. Accordingly, the load on relative movement between the two annular members in the axial direction is reduced, and the possibility of scuffing occurring on an outer periphery of the inner annular member is minimized.

It is desirable for the inner annular member to include an annular flange portion formed on an outer peripheral surface of the inner annular member at a position different from the small-diameter outer peripheral portion and the large-diameter outer peripheral portion in the axial direction, the annular flange portion being greater in diameter than the large-diameter outer peripheral portion. The annular flange portion and the light shielding ring overlap in radial directions. In the operating state, an amount of overlapping between the light shielding ring and the annular flange portion in the radial directions is greater than a distance between the light shielding ring and the annular flange portion in the axial direction. According to this structure, an excellent light shielding capability is obtained even though the light shielding structure is simple.

It is desirable for the inner annular member to include a tapered outer peripheral portion which is provided between the small-diameter outer peripheral portion and the large-diameter outer peripheral portion, the tapered outer peripheral portion gradually increasing in diameter in a direction from the small-diameter outer peripheral portion toward the large-diameter outer peripheral portion. According to this structure, the inner annular member can be moved smoothly relative to the outer annular member between the inner annular member and the light shielding ring.

It is desirable, with respect to space utilization and simplification of the light shielding structure, that the light shielding ring is supported in an annular space formed inside the outer annular member. More specifically, it is desirable for the light shielding ring to be formed into a flat ring member which lies in a plane orthogonal to axes of the inner annular member and the outer annular member, and for the light shielding structure to include a spring member for making the flat ring member held in the annular space. It is desirable for the spring member to be an annular waveform spring, since the light shielding structure can be simplified and disposed in a space-saving manner.

Although the outer annular member can be made as a single-piece member, it is possible for the outer annular member to include a first outer annular member having an inner flange portion, and a second outer annular member having an axially-opposed end surface which is opposed to the inner flange portion in the axial direction. The light shielding ring and the spring member are held between the inner flange portion and the axially-opposed end surface. In this case, the annular space in which the light shielding ring and the spring member are supported is formed between the inner flange portion and the axially-opposed end surface.

It is desirable for the first outer annular member and the second outer annular member to be coupled to each other to be relatively rotatable by engagement of a circumferential groove about an axis of the outer annular member with at least one rotation guide projection which slidably engages in the circumferential groove. The spring member presses the rotation guide projection against a slide contact surface in the circumferential groove. In this case, the spring can be made to function as a backlash removing device which presses the rotation guide projection against a slide contact surface in the circumferential groove. In addition, in the operating state, the annular flange portion presses the spring member so as to increase a pressing force thereof which urges the light shielding member to be pressed against the axially-opposed end surface.

It is desirable for the inner flange portion to be formed as an independent member which is fixed at a front end of the first outer annular member.

It is desirable for the outer annular member and the inner annular member to be elements of a lens barrel, and for the operating state and the non-operating state respectively correspond to a ready-to-photograph state and a retracted state, in which the inner annular member is retracted into the outer annular member.

It is desirable for the lens group to include at least one lens group positioned inside the inner annular member, and for the inner annular member to support the lens group and to be movable between the retracted state, in which the inner annular member is retracted in an axial direction into the outer annular member, and the ready-to-photograph state, in which the inner annular member advances in an axial direction from the outer annular member.

In an embodiment, a light shielding structure of an optical device is provided, including an outer annular member and an inner annular member which move relative to each other in an axial direction, the outer annular member being concentrically positioned outside the inner annular member; a light shielding ring supported in an annular space formed inside the outer annular member to project radially inwards; and an annular flange portion which is formed on an outer peripheral surface of the inner annular member to project radially outwards, the annular flange portion overlapping the light shielding ring in radial directions. In an operating state of the optical device in which a clearance between the outer annular member and the inner annular member is to be made light-tight, an amount of the overlapping between the light shielding ring and the annular flange portion in the radial directions is greater than a distance between the light shielding ring and the annular flange portion in the axial direction.

In the operating stage of the optical device, it is desirable for the amount of overlapping between the light shielding ring and the annular flange portion in the radial directions to be greater than a radial distance between a radially inner edge of the light shielding ring and an outer peripheral surface of the inner annular member.

In an embodiment, a light shielding structure of an optical device is provided, including an outer annular member and an inner annular member which move relative to each other in an axial direction, the outer annular member being concentrically positioned outside the inner annular member; an annular flange portion which is formed on one of the inner annular member and the outer annular member; and a light shielding ring which is supported by the other of the inner annular member and the outer annular member. The annular flange portion and the light shielding ring project in an annular space between the outer annular member and the inner annular member so as to overlap each other in radial directions. In an operating state of the optical device in which a clearance between the outer annular member and the inner annular member is to be made light-tight, an amount of the overlapping between the light shielding ring and the annular flange portion in the radial directions is greater than a distance between the light shielding ring and the annular flange portion in the axial direction.

The present disclosure relates to subject matter contained in Japanese Patent Application No. 2008-55799 (filed on Mar. 6, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
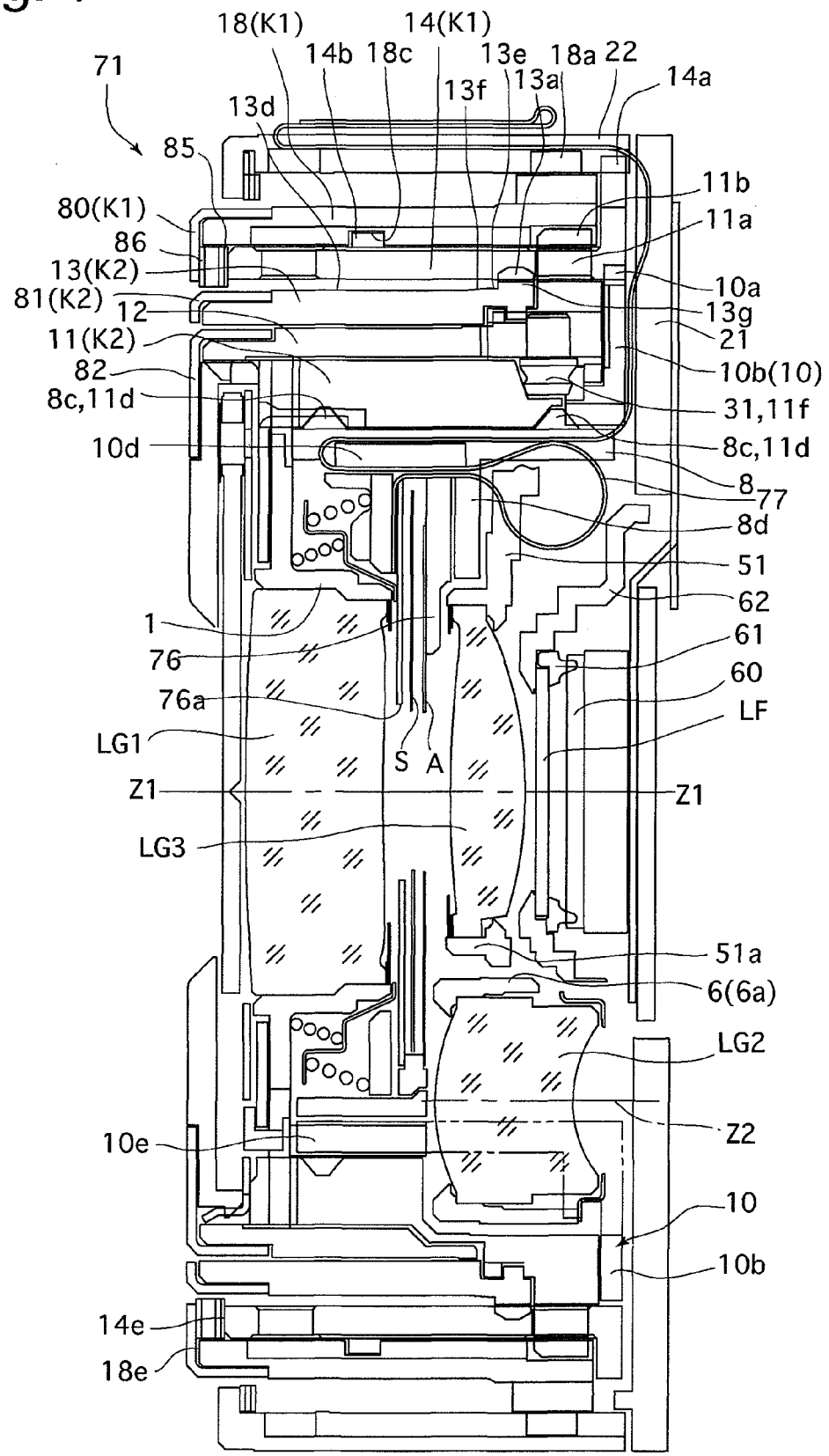
FIG. 1 is an axial cross sectional view of an embodiment of a zoom lens according to the present invention, showing the fully-retracted state of the zoom lens.

The overall structure of an embodiment of a zoom lens (optical device) 71 will be first discussed hereinafter. The zoom lens 71 is provided with an imaging optical system (photographing optical system) including a first lens group LG1, a shutter S, an adjustable diaphragm A, a second lens group LG2, a third lens group LG3, a low-pass filter (optical filter) LF, and a solid-state image pickup device (hereinafter referred to as an image sensor) 60 in that order from the object side. An imaging optical axis (photographing optical axis) Z1 of the imaging optical system is substantially coincident with the central axis of each external barrel (12, 13 and 18) which forms the outward appearance of the zoom lens 71. The first lens group LG1 and the second lens group LG2 are driven along the imaging optical axis Z1 in a predetermined moving manner to perform a zooming operation, while the third lens group L3 is driven along the imaging optical axis Z1 to perform a focusing operation. In the following descriptions, the term "optical axis direction" means a direction on or parallel to the imaging optical axis Z1 unless there is a different explanatory note on the expression.

The zoom lens 71 is provided with a stationary barrel 22, and is further provided behind the stationary barrel 22 with an image sensor holder 21 fixed to the back of the stationary barrel 22. The image sensor 60 is mounted on the image sensor holder 21 to be held thereby, and the low-pass filter LF is held by the image sensor holder 21 to be positioned in front of the image sensor 60 via a filter holder 62 and an annular sealing member 61. The filter holder 62 is fixed to the front of the image sensor holder 21.

Figure 2:
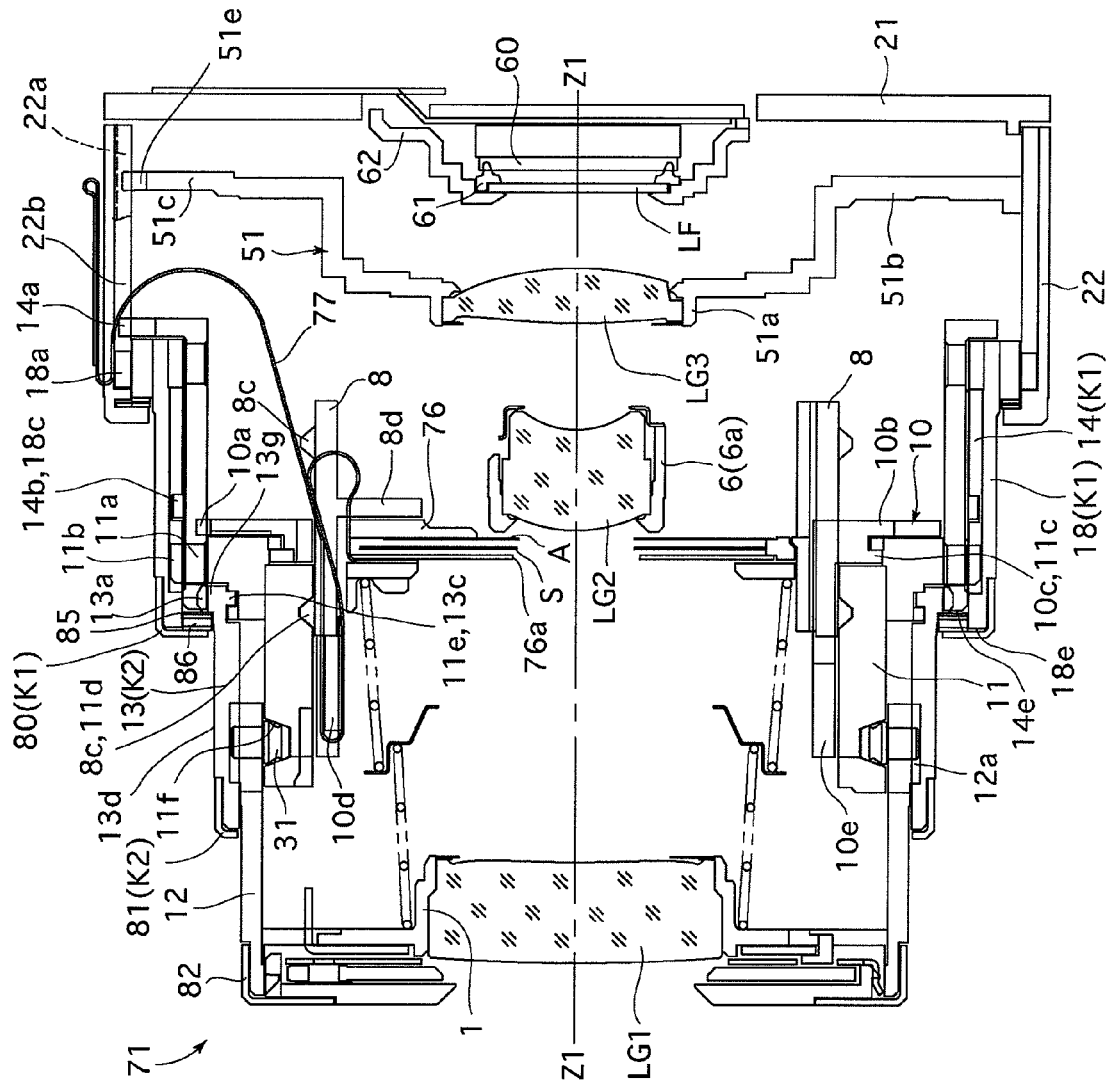
FIG. 2 is an axial cross sectional view of the zoom lens, showing a state of the zoom lens at the wide-angle extremity.
Figure 3:
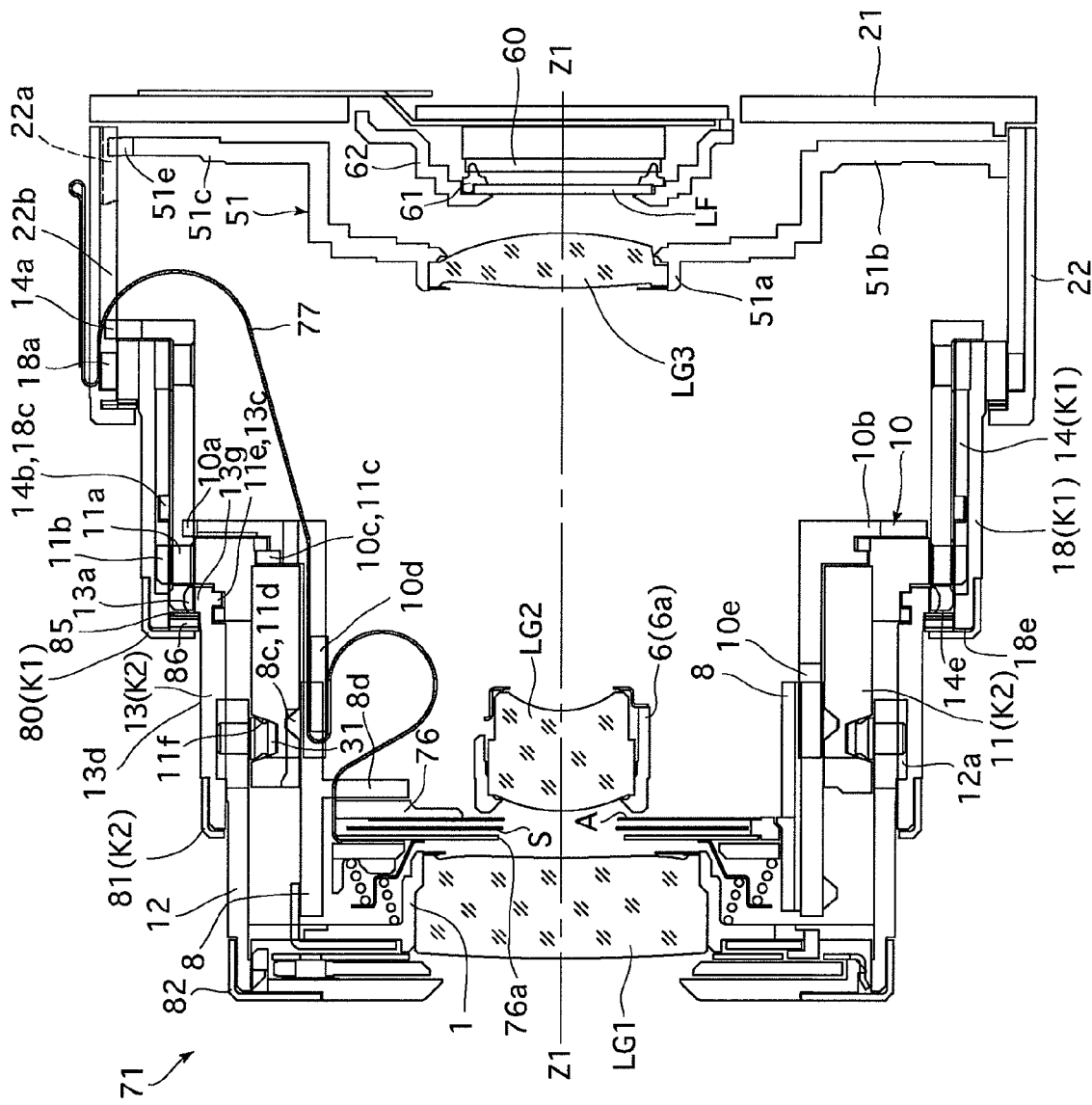
FIG. 3 is an axial cross sectional view of the zoom lens, showing a state of the zoom lens at the telephoto extremity.

The zoom lens 71 is provided in the stationary barrel 22 with an AF lens frame (third lens frame which supports and holds the third lens group LG3) 51 which is guided linearly in the optical axis direction, i.e., without rotating about the imaging optical axis Z1. The AF lens frame 51 is provided with a lens holder portion 51a which holds the third lens group LG3, and a pair of arm portions 51b and 51c which extend radially outwards from the lens holder portion 51a in substantially in opposite directions. The zoom lens 71 is provided between the stationary barrel 22 and the image sensor holder 21 with an AF guide shaft 52 (see FIG. 5), the front and rear ends of which are supported by the stationary barrel 22 and the image sensor holder 21, respectively, so that the AF guide shaft 52 extends parallel to the imaging optical axis Z1. The arm portion 51b of the AF lens frame 51 is provided at the radially outer end thereof with a guide hole 51d in which the AF guide shaft 52 is slidably engaged. The arm portion 51c of the AF lens frame 51 is provided at the radially outer end thereof with a guide end portion 51e which is slidably engaged in a linear guide groove 22a (part of which is shown in FIGS. 2 and 3) formed on an inner peripheral surface of the stationary barrel 22 so as to extend parallel to the imaging optical axis Z1. The zoom lens 71 is provided with an AF motor 160 (see FIG. 5) having a rotary drive shaft which is threaded to serve as a feed screw shaft, and this rotary drive shaft is screwed through a screw hole formed on an AF nut 54 (see FIG. 5). The AF nut 54 abuts against a portion of the arm portion 51b in the vicinity of the guide hole 51d from front while being prevented from rotating relative to the AF lens frame 51. The AF lens frame 51 is biased forward by an AF frame biasing spring 55 to be pressed against the AF nut 54, and the forward movement limit of the AF lens frame 51 in the optical axis direction is determined via engagement between the AF lens frame 51 and the AF nut 54. With this structure, upon the AF nut 54 being moved rearward in the optical axis direction, the AF lens frame 51 is pressed rearward by the AF nut 54 to thereby move rearward against the biasing force of the AF frame biasing spring 55. Conversely, upon the AF nut 54 being forward in the optical axis direction, the AF lens frame 51 follows forward movement of the AF nut 54 to move forward by the biasing force of the AF frame biasing spring 55. With the structure described above, rotating the rotary drive shaft of the AF motor 160 forward and rearward causes the AF lens frame 51 to move forward and rearward in the optical axis direction, respectively.

The zoom lens 71 is provided with a zoom motor 150 and a reduction gear box 74 which are mounted on the stationary barrel 22 to be supported thereby. The reduction gear box 74 contains a reduction gear train for transferring rotation of the zoom motor 150 to a zoom gear 28 (see FIG. 5). The zoom gear 28 is positioned inside the stationary barrel 22 and rotatably fitted on a zoom gear shaft extending parallel to the imaging optical axis Z1.

Figure 5:
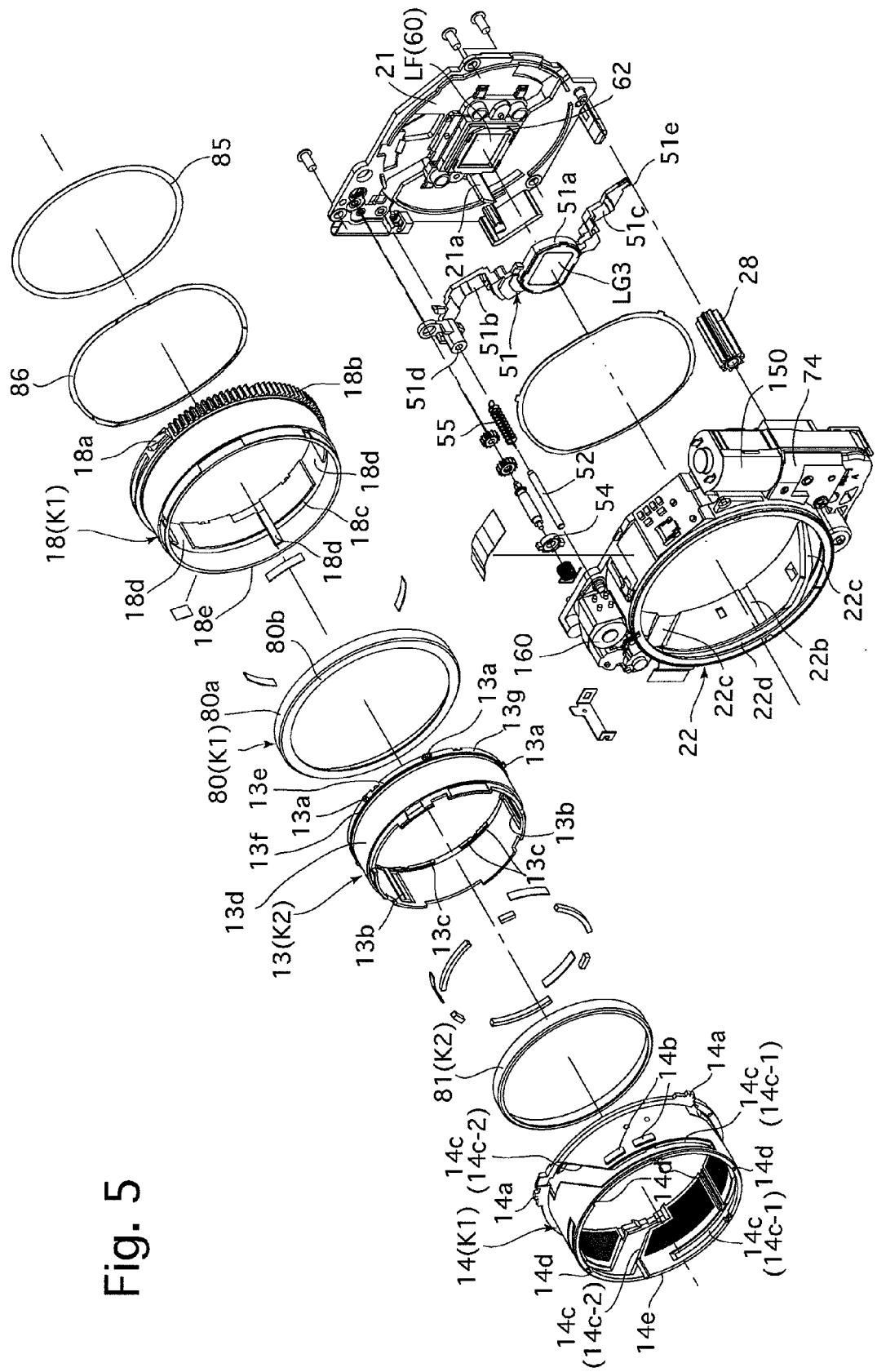
FIG. 5 is an exploded perspective view of another portion of the zoom lens.
Figure 6:
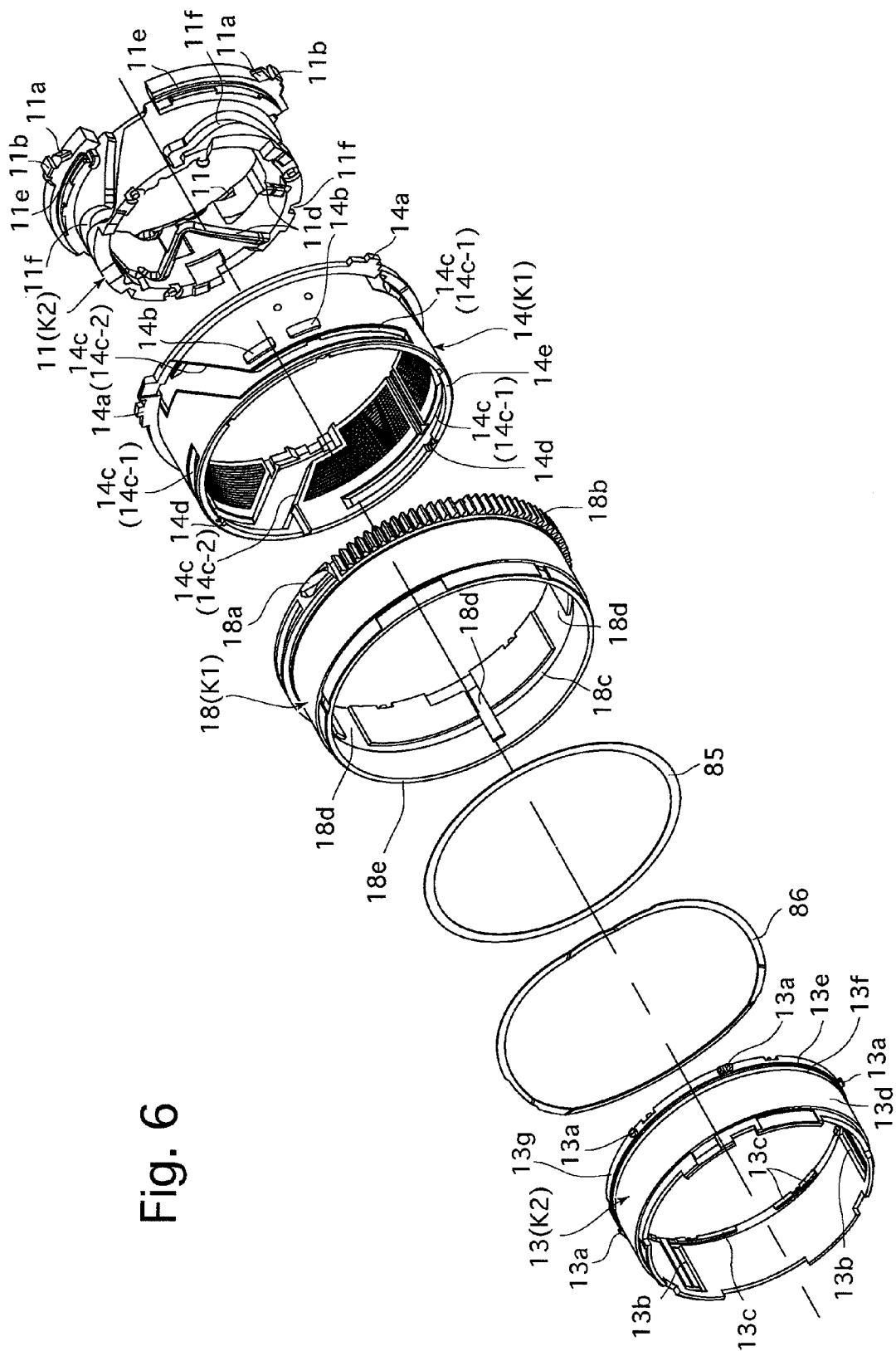
FIG. 6 is an exploded perspective view of a portion of the zoom lens for illustrating an embodiment of a light shielding structure provided between a first telescopic stage and a second telescopic stage of the zoom lens.

As shown in FIG. 5, the stationary barrel 22 is provided on an inner peripheral surface thereof with a set of three linear guide grooves 22b, a set of three inclined grooves 22c and a set of three rotation guide grooves 22d. The linear guide grooves 22b extend parallel to the imaging optical axis Z1. The inclined grooves 22c are inclined with respect to the imaging optical axis Z1. The rotation guide grooves 22d are formed in the vicinity of a front end of the inner peripheral surface of the stationary barrel 22 to extend along a circumference of the stationary barrel 22 to communicate with the front ends of each of the inclined grooves 22c. The three linear guide grooves 22b, the three inclined grooves 22c and the three rotation guide grooves 22d are respectively arranged at substantially equi-angular intervals in the circumferential direction.

The zoom lens 71 is provided immediately inside the stationary barrel 22 with a first advancing barrel (outer annular member/first outer annular member) 18 which advances from and retracts into the stationary barrel 22. The first advancing barrel 18 is provided on an outer peripheral surface thereof with a set of three rotation guide projections 18a and an outer circumferential gear 18b. The set of three rotation guide projections 18a are engageable with both the set of three inclined grooves 22c and the set of three rotation guide grooves 22d, respectively. The outer circumferential gear 18b is engaged with the zoom gear 28. During the time the set of three rotation guide projections 18a remain engaged in the set of three inclined grooves 22c, the first advancing barrel 18 advances and retracts in the optical axis direction while rotating while being guided by the set of three inclined grooves 22c. Thereafter, upon the set of three rotation guide projections 18a entering the set of three rotation guide grooves 22d, respectively, the first advancing barrel 18 only rotates about the imaging optical axis Z1 at an axially fixed position (i.e., does not move in the optical axis direction relative to the stationary barrel 22) while being guided by the set of three rotation guide grooves 22d.

The first advancing barrel 18 is provided on an inner peripheral surface thereof with a circumferential groove 18c about the imaging optical axis Z1 and a set of three rotation transfer grooves 18d which extend parallel to the imaging optical axis Z1. The zoom lens 71 is provided with a first linear guide ring (outer annular member/second outer annular member) 14 which is positioned inside the first advancing barrel 18 and supported thereby. The first linear guide ring 14 is provided on an outer peripheral surface thereof with a set of three linear guide projections 14a and a plurality of relative rotation guide projections 14b. The set of three linear guide projections 14a project radially outwards, and the plurality of relative rotation guide projections 14b project radially outwards at different circumferential positions on the first linear guide ring 14. The first linear guide ring 14 is guided linearly in the optical axis direction relative to the stationary barrel 22 by engagement of the set of three linear guide projections 14a with the set of three linear guide grooves 22b. The first advancing barrel 18 is coupled to the first linear guide ring 14 by making the circumferential groove 18c engaged with the plurality of relative rotation guide projections 14b. The first advancing barrel 18 and the first linear guide ring 14 move together in the optical axis direction. A decorative ring (outer annular member/first outer annular member) 80 is fixed to the front end of the first advancing barrel 18.

The first linear guide ring 14 is provided with a set of through-slots 14c which are formed through inner and outer peripheral surfaces of the first linear guide ring 14. As shown in FIG. 5, each through-slot 14c includes a front circumferential slot portion 14c-1 and an inclined lead slot portion 14c-2 which is inclined with respect to the optical axis direction. The number of the through-slots 14c is three; the three through-slots 14c are arranged at different circumferential positions. The zoom lens 71 is provided with a cam ring (inner annular member) 11 which is positioned inside the first linear guide ring 14 and rotatably supported thereby. A set of three cam ring guide projections 11a fixed to an outer peripheral surface of the cam ring 11 at different circumferential positions thereon are engaged in the set of three through-slots 14c, respectively. The cam ring 11 is provided on the set of three cam ring guide projections 11a with a set of three rotation transfer projections 11b which project radially outwards to be engaged in the set of three rotation transfer grooves 18d of the first advancing barrel 18, respectively. The set of three rotation transfer projections 11b are slidable relative to the set of three rotation transfer grooves 18d in the optical axis direction and are prevented from moving in the circumferential direction relative to the set of three rotation transfer grooves 18d so that the cam ring 11 rotates with the first advancing barrel 18.

Advancing operations of movable elements of the zoom lens 71 from the stationary barrel 22 to the cam ring 11 are understood from the above described structure of the zoom lens 71. Namely, rotating the zoom gear 28 in a lens barrel advancing direction by the zoom motor 150 causes the first advancing barrel 18 to move forward while rotating due to engagement of the set of three inclined grooves 22c with the set of three rotation guide projections 18a. This rotation of the first advancing barrel 18 causes the first linear guide ring 14 to move forward with the first advancing barrel 18 because the first advancing barrel 18 is coupled to the first linear guide ring 14 in a manner to make relative rotation between the first advancing barrel 18 and the first linear guide ring 14 possible and to be movable with the first linear guide ring 14 in the optical axis direction due to the engagement of the plurality of relative rotation guide projections 14b with the circumferential groove 18c. In addition, rotation of the first advancing barrel 18 is transferred to the cam ring 11 via the set of three rotation transfer grooves 18d and the set of three rotation transfer projections 11b. Thereupon, the cam ring 11 moves forward while rotating relative to the first linear guide ring 14 while the set of three cam ring guide projections 11a are guided by the lead slot portions 14c-2 of the set of three through-slots 14c, respectively. Since the first linear guide ring 14 itself also moves forward with the first advancing barrel 18 as described above, the cam ring 11 eventually moves forward in the optical axis direction by an amount of movement corresponding to the sum of the amount of the forward movement of the cam ring 11 (while it rotates) in accordance with the contours of the lead slot portions 14c-2 of the set of three through-slots 14c and the amount of the forward linear movement of the first linear guide ring 14.

The above described advancing operation of the cam ring 11 is performed only while each rotation guide projection 18a and the associated inclined groove 22c are engaged with each other. Upon the first advancing barrel 18 being moved forward by a predetermined amount of movement, the set of three rotation guide projections 18a are disengaged from the set of three inclined grooves 22c to enter the set of three rotation guide grooves 22d, respectively. Thereupon, a forward moving force which makes the first advancing barrel 18 move forward stops being applied to the first advancing barrel 18, so that the first advancing barrel 18 only rotates at an axial fixed position, i.e., without moving in the optical axis direction, due to the engagement of the set of three rotation guide projections 18a with the set of three rotation guide grooves 22d. In addition, at substantially the same time when the set of three rotation guide projections 18a slide into the set of three rotation guide grooves 22d from the set of three inclined grooves 22c, respectively, the set of three cam ring guide projections 11a enter the circumferential slot portions 14c-1 of the set of three through-slots 14c, respectively. Thereupon, a force which makes the cam ring 11 move forward also stops being applied to the cam ring 11. Consequently, the cam ring 11 only rotates at an axial fixed position in the optical axis direction in accordance with rotation of the first advancing barrel 18.

The first linear guide ring 14 is provided on an inner peripheral surface thereof with a plurality of linear guide grooves 14d which are formed at different circumferential positions to extend parallel to the imaging optical axis Z1. The zoom lens 71 is provided inside the first linear guide ring 14 with a second linear guide ring 10. The second linear guide ring 10 is provided on an outer edge thereof with a corresponding plurality of linear guide projections 10a which project radially outwards to be slidably engaged in the plurality of linear guide grooves 14d, respectively. The zoom lens 71 is provided immediately inside of the first advancing barrel 18 with a second advancing barrel (inner annular member) 13 which advances from and retracts into the first advancing barrel 18. The second advancing barrel 13 is provided, on an outer peripheral surface thereof in the vicinity of the rear end of the second advancing barrel 13, with a plurality of radial projections 13a which project radially outwards to be slidably engaged in the plurality of linear guide grooves 14d, respectively. Therefore, each of the second advancing barrel 13 and the second linear guide ring 10 is guided linearly in the optical axis direction via the first linear guide ring 14. The front ends of the plurality of linear guide grooves 14d are formed as open ends at the front end of the first linear guide ring 14.

The zoom lens 71 is provided inside the cam ring 11 with a second lens group moving frame 8 which indirectly supports and holds the second lens group LG2. The zoom lens 71 is provided immediately inside the second advancing barrel 13 with a third advancing barrel 12 which advances from and retracts into the second advancing barrel 13. The second advancing barrel 13 serves as a linear guide member for linearly guiding the third advancing barrel 12 that supports the first lens group LG1.

The support structure for the second lens group LG2 will be discussed hereinafter. The second linear guide ring 10 is provided with an annular flange portion 10b and a front annular flange portion 10c. The plurality of linear guide projections 10a project radially outwards from the outer edge of the annular flange portion 10b, and the front annular flange portion 10c is formed in front of the annular flange portion 10b and is smaller in diameter than the annular flange portion 10b. The front annular flange portion 10c is slidably engaged in a circumferential groove 11c formed on an inner peripheral surface of the cam ring 11 in the vicinity of the rear end thereof. Due to this structure, the second linear guide ring 10 is coupled to the cam ring 11 to be rotatable relative to the cam ring 11 and to be prevented from moving in the optical axis direction relative to the cam ring 11. The second linear guide ring 10 is provided with a first linear guide key (projection) 10*d* and a second linear guide key (projection) 10*e* both of which project toward the front from the front annular flange portion 10*c*. The first linear guide key 10*d* and the second linear guide key 10*e* project forward to be positioned inside of the cam ring 11. Opposite edges of the first linear guide key 10*d* in the circumferential direction of the second linear guide ring 10 are formed as a pair of linear guide surfaces G1 that are parallel to the imaging optical axis Z1, and opposite edges of the second linear guide key 10*e* in the circumferential direction of the second linear guide ring 10 are formed as a pair of linear guide surfaces G2 that are also parallel to the imaging optical axis Z1.

The second lens group moving frame 8, which is positioned inside the cam ring 11 and supported thereby, is provided with a first linear guide groove 8*a* and a second linear guide groove 8*b* in which the first linear guide key 10*d* and the second linear guide key 10*e* are engaged, respectively. Each of the first linear guide groove 8*a* and the second linear guide groove 8*b* is formed as a partly-bottomed groove on an outer peripheral surface of the second lens group moving frame 8; more specifically, the second lens group moving frame 8 is provided at the midportion in the width direction of the first linear guide groove 8*a* with a radial through-hole through which a flexible PWB 77 for exposure control passes, and the second lens group moving frame 8 is provided, at the midportion in the width direction of the second linear guide groove 8*b* at the rear end thereof, with a through-cutout 8*g* which is formed through the bottom wall of the second linear guide groove 8*b* in a radial direction of the second lens group moving frame 8. The second lens group moving frame 8 is provided, in the first linear guide groove 8*a* on the circumferentially opposite sides thereof, with a pair of linear guide surfaces G3 which are in sliding contact with the pair of linear guide surfaces G1 of the first linear guide key 10*d*, respectively. Likewise, the second lens group moving frame 8 is provided, in the second linear guide groove 8*b* on the circumferentially opposite sides thereof, with a pair of linear guide surfaces G4 which are in sliding contact with the pair of linear guide surfaces G2 of the second linear guide key 10*e*, respectively. Due to the engagement between the pair of linear guide surfaces G3 and the pair of linear guide surfaces G1 and the engagement between the pair of linear guide surfaces G4 and the pair of linear guide surfaces G2, the second lens group moving frame 8 is guided linearly in the optical axis direction.

The cam ring 11 is provided on an inner peripheral surface thereof with a plurality of cam grooves 11*d* in which a corresponding plurality of cam followers 8*c* formed on an outer peripheral surface of the second lens group moving frame 8 are engaged, respectively. The plurality of cam grooves 11*d* and the plurality of cam followers 8*c* are utilized for relatively moving the second lens group LG2 in the optical axis direction. Namely, since the second lens group moving frame 8 is guided linearly in the optical axis direction via the second linear guide ring 10, a rotation of the cam ring 11 causes the second lens group moving frame 8 to move in the optical axis direction in a predetermined moving manner in accordance with the contours of the plurality of cam grooves 11*d*.

Figure 4:
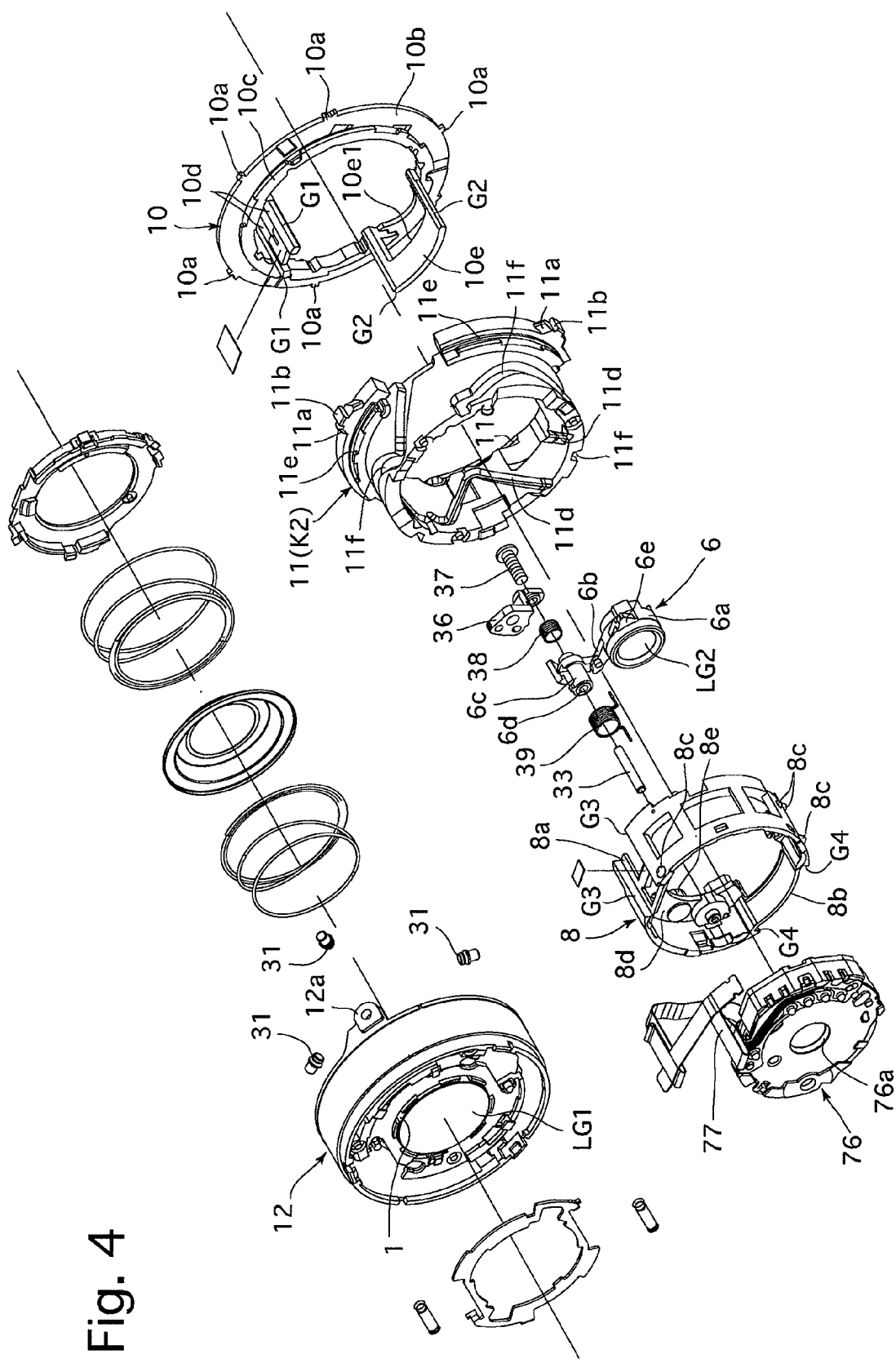
FIG. 4 is an exploded perspective view of a portion of the zoom lens.

The second lens group moving frame 8 is provided with an annular flange 8*d* having a through-opening at a center thereof through which the imaging optical axis Z1 passes. A second lens group pivot shaft 33 is fixed to the second lens group moving frame 8 to extend parallel to the imaging optical axis Z1. The front and rear ends of the second lens group pivot shaft 33 are supported by a shaft support portion 8*e* (part of which is shown in FIG. 4) formed on the annular flange portion 8*d* and a shaft support member 36, respectively. The shaft support member 36 is fixed to a mounting seat (not shown) formed on the rear of the annular flange 8*d* by a fixing screw 37. The zoom lens 71 is provided inside the second lens group moving frame 8 with a second lens frame 6 which supports and holds the second lens group LG2. The second lens frame 6 is pivoted on the second lens group pivot shaft 33. The second lens frame 6 is provided with a cylindrical lens holder portion 6*a*, a swing arm portion 6*b* and a pivoted cylindrical portion 6*c*. The cylindrical lens holder portion 6*a* holds the second lens group LG2. The swing arm portion 6*b* extends in a radial direction of the cylindrical lens holder portion 6*a*, and the pivoted cylindrical portion 6*c* is formed at the free end (opposite end) of the swing arm portion 6*b*. The pivoted cylindrical portion 6*c* is provided with a through-hole 6*d* extending in a direction parallel to the optical axis Z2 of the second lens group LG2. The second lens group pivot shaft 33 is inserted into the through-hole 6*d* so as to allow relative rotation therebetween. The second lens group pivot shaft 33 is eccentrically positioned with respect to the imaging optical axis Z1, and extends parallel to the imaging optical axis Z1. The second lens frame 6 is rotatable (swingable) about the second lens group pivot shaft 33 between an on-axis position (photographing position) shown in FIGS. 2 and 3 where the optical axis Z2 of the second lens group LG2 coincides with the imaging optical axis Z1, and an off-axis displaced position (retracted away from the imaging optical axis Z1) shown in FIG. 1 where the optical axis Z2 of the second lens group LG2 is eccentrically positioned with respect to the imaging optical axis Z1. The second lens frame 6 is biased to rotate in a direction toward the on-axis position by a torsion coil spring 39. The second lens frame 6 and the second lens group moving frame 8 are provided with an engaging protrusion 6*e* and a rotation limit pin (not shown), respectively, and the on-axis position of the second lens frame 6 is determined by the engagement of the engaging protrusion 6*e* of the second lens frame 6 with the rotation limit pin 35. The second lens frame 6 is biased forward (in a direction to bring the second lens frame 6 into contact with the annular flange 8*d* of the second lens group moving frame 8) by a compression coil spring (axial direction pressure spring) 38 to remove backlash of the second lens frame 6 relative to the second lens group moving frame 8 in the optical axis direction.

The second lens frame 6 moves integrally with the second lens group moving frame 8 in the optical axis direction. The image sensor holder 21 is provided on the front thereof with a position-control cam bar 21*a* which projects forward from the image sensor holder 21 to be engageable with the second lens frame 6. If the second lens group moving frame 8 moves rearward in a retracting direction to approach the image sensor holder 21 in a state where the second lens frame 6 is supported at the on-axis position, a cam surface formed on a front end surface of the position-control cam bar 21*a* comes into contact with the second lens frame 6 to rotate the second lens frame 6 to the aforementioned off-axis displaced position against the biasing force of the torsion coil spring 39.

The zoom lens 71 is provided in the second lens group moving frame 8 with a shutter unit 76 which includes the shutter S (which opens and shuts a photographing aperture 76*a*) and the adjustable diaphragm A. The shutter unit 76 is fixed to the front of the annular flange portion 8*d* of the second lens group moving frame 8. The distance between the shutter S and the second lens group LG2 in the optical axis direction is fixed, and the distance between the adjustable diaphragm A and the second lens group LG2 in the optical axis direction is fixed. The shutter unit 76 is provided therein with a shutter actuator and a diaphragm actuator (both not shown) for driving the shutter S and the adjustable diaphragm A, respectively, and the flexible PWB 77 extends from the shutter unit 76 to establish electrical connection between a control circuit of the camera (not shown) to which the zoom lens 71 is mounted and each of these two actuators.

The support structure for the first lens group LG1 will be discussed hereinafter. The second advancing barrel 13, which is guided linearly in the optical axis direction via the first linear guide ring 14, is provided on an inner peripheral surface thereof with a set of three linear guide grooves 13b which are formed at different circumferential positions to extend in the optical axis direction. The third advancing barrel 12 is provided on an outer peripheral surface at the rear end thereof with a set of three engaging protrusions 12a which are slidably engaged in the set of three linear guide grooves 13b, respectively. Accordingly, the third advancing barrel 12 is guided linearly in the optical axis direction via the first linear guide ring 14 and the second advancing barrel 13. The second advancing barrel 13 is further provided, on an inner peripheral surface thereof in the vicinity of the rear end thereof, with a discontinuous inner flange 13c which extends along the circumference of the second advancing barrel 13. The cam ring 11 is provided on an outer peripheral surface thereof with a discontinuous circumferential groove 11e in which the discontinuous inner flange 13c is slidably engaged so that the cam ring 11 is rotatable relative to the second advancing barrel 13 and so that the second advancing barrel 13 does not relatively move in the optical axis direction with respect to the cam ring 11. The third advancing barrel 12 is provided on an inner peripheral surface thereof with a set of three cam followers 31 which project radially inwards, while the cam ring 11 is provided on an outer peripheral surface thereof with a set of three outer cam grooves 11f (cam grooves for moving the first lens group LG1) in which the set of three cam followers 31 are slidably engaged, respectively. A first lens frame 1 which holds the first lens group LG1 is provided inside the third advancing barrel 12. A decorative ring (inner annular member) 81 and a decorative ring 82 are fixed to the front ends of the second advancing barrel 13 and the third advancing barrel 12, respectively.

An advancing operation and a retracting operation of the zoom lens 71 will be discussed hereinafter.

Since the stage at which the cam ring 11 is driven to advance from the retracted position (shown in FIG. 1) to the position (shown in FIG. 2) where the cam ring 11 rotates at the axial fixed position in the optical axis direction has been discussed above, this stage will only be briefly discussed hereinafter. Rotating the zoom gear 28 in the lens barrel advancing direction via the zoom motor 150 from the retracted state of the zoom lens 71 shown in FIG. 1 causes the first advancing barrel 18 to move forward while rotating. At this time, the cam ring 11 which rotates by rotation of the first advancing barrel 18 moves forward in the optical axis direction by an amount of movement corresponding to the sum of the amount of the forward movement of the first linear guide ring 14 and the amount of the forward movement of the cam ring 11 by a leading structure between the cam ring 11 and the first linear guide ring 14 (i.e., by engagement of the set of cam ring guide projections 11a and the lead slot portions 14c-2 of the set of three through-slots 14c, respectively). Once the first advancing barrel 18 and the cam ring 11 advance to respective predetermined positions, the functions of the rotating-advancing structures of the first advancing barrel 18 and the cam ring 11 are canceled, so that each of the first advancing barrel 18 and the cam ring 11 rotates about the imaging optical axis Z1 without moving in the optical axis direction.

A rotation of the cam ring 11 causes the second lens group moving frame 8, which is positioned inside the cam ring 11, to move in the optical axis direction with respect to the cam ring 11 in a predetermined moving manner due to the engagement of the plurality of cam followers 8c of the second lens group moving frame 8 with the plurality of cam grooves 11d, respectively. In the state shown in FIG. 1, in which the zoom lens 71 is in the retracted state, the second lens frame 6, which is positioned inside the second lens group moving frame 8, is held at the off-axis displaced position, in which the optical axis Z2 of the second lens group LG2 is eccentricity positioned downward from the imaging optical axis Z1, by the position-control cam bar 21a. During the course of movement of the second lens group moving frame 8 from the retracted position to the wide-angle extremity position in the zooming range, the second lens frame 6 is disengaged from the position-control cam bar 21a to rotate about the second lens group pivot shaft 33 from the off-axis displaced position to the photographing position where the optical axis Z2 of the second lens group LG2 coincides with the imaging optical axis Z1 via the spring force of the torsion coil spring 39. Thereinafter, the second lens frame 6 remains held in the photographing position until the zoom lens 71 is retracted to the retracted position.

In addition, a rotation of the cam ring 11 causes the third advancing barrel 12, which is positioned around the cam ring 11 and guided linearly in the optical axis direction via the second advancing barrel 13, to move in the optical axis direction relative to the cam ring 11 in a predetermined moving manner due to engagement of the set of three cam followers 31 with the set of three outer cam grooves 11f, respectively.

Therefore, an axial position of the first lens group LG1 relative to an imaging surface (light-receiving surface of the image sensor 60) when the first lens group LG1 is moved forward from the retracted position is determined by the sum of the amount of forward movement of the cam ring 11 relative to the stationary barrel 22 and the amount of movement of the third advancing barrel 12 relative to the cam ring 11, while an axial position of the second lens group LG2 relative to the imaging surface when the second lens group LG2 is moved forward from the retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 along the imaging optical axis Z1 while changing the air-distance therebetween. When the zoom lens 71 is driven to advance from the retracted position shown in FIG. 1, the zoom lens 71 firstly extends into the state shown in FIG. 2, in which the zoom lens 71 is set at the wide-angle extremity. Subsequently, the zoom lens 71 goes into the state shown in FIG. 3, in which the zoom lens 71 is set at the telephoto extremity by a further rotation of the zoom motor 150 in a lens barrel advancing direction thereof. As can be seen from FIGS. 2 and 3, the space between the first and second lens groups LG1 and LG2 when the zoom lens 71 is set at the wide-angle extremity is greater than that when the zoom lens 71 is set at the telephoto extremity. When the zoom lens 71 is set at the telephoto extremity, the first and second lens groups LG1 and LG2 have moved to approach each other to have a distance therebetween which is smaller than that of when the zoom lens 71 is set at the wide-angle extremity. This variation of the air-distance between the first and second lens groups LG1 and LG2 for zooming operation is achieved by contours of the plurality of cam grooves 11d and the set of three outer cam grooves 11f. In the zooming range (zooming operation performable range) between the wide-angle extremity and the telephoto extremity, the cam ring 11 and the first advancing barrel 18 rotate at their respective axial fixed positions, i.e., without moving in the optical axis direction.

When the first through third lens groups LG1, LG2 and LG3 are positioned in the zooming range, a focusing operation is carried out by moving the third lens group L3 (the AF lens frame 51) along the imaging optical axis Z1 by rotation of the AF motor 160 in accordance with an object distance.

Driving the zoom motor 150 in a lens barrel retracting direction causes the zoom lens 71 to operate in the reverse manner to the above described advancing operation so as to fully retract the zoom lens 71 to the retracted position as shown in FIG. 1. During the course of this retracting movement of the zoom lens 71, the second lens frame 6 rotates about the second lens group pivot shaft 33 to the off-axis displaced position via the position-control cam bar 21a while moving rearward with the second lens group moving frame 8. When the zoom lens 71 is retracted to the retracted position, the second lens group LG2 is retracted into a space radially outside the space in which the third lens group LG3, the low-pass filter LF and the image sensor 60 are accommodated as shown in FIG. 1. In other words, the second lens group LG2 is radially retracted into an axial range substantially identical to an axial range in the optical axis direction in which the third lens group LG3, the low-pass filter LF and the CCD image sensor 60 are positioned. This structure of the zoom lens 71 for retracting (displacing) the second lens group LG2 in this manner reduces the length of the zoom lens 71 when the zoom lens 71 is fully retracted, thus making it possible to achieve a reduction of the thickness of the camera to which the zoom lens 71 is mounted.

As described above, the zoom lens 71 is a telescoping zoom lens having three advancing (telescopic) stages (concentric barrels) that fit one within another. The first advancing barrel 18 and the first linear guide ring 14, which constitute a first telescopic stage having the largest diameter among the three telescopic stages, are coupled to each other to be rotatable relative to each other. In addition, the second advancing barrel 13 and the cam ring 11, which are annular members constituting a second telescopic stage, are positioned radially inside the first linear guide ring 14. The first linear guide ring 14 and the first advancing barrel 18 integrally move together in the optical axis direction. A combination of the first linear guide ring 14 and the first advancing barrel 18 together with the decorative ring 80 will be referred to as an outer annular member K1 in the following descriptions. In addition, the cam ring 11 and the second advancing barrel 13 also integrally move together in the optical axis direction while rotating relative to each other. A combination of the cam ring 11 and the second advancing barrel 13 together with the decorative ring 81 will be referred to as an inner annular member K2 in the following description.

Figure 7:
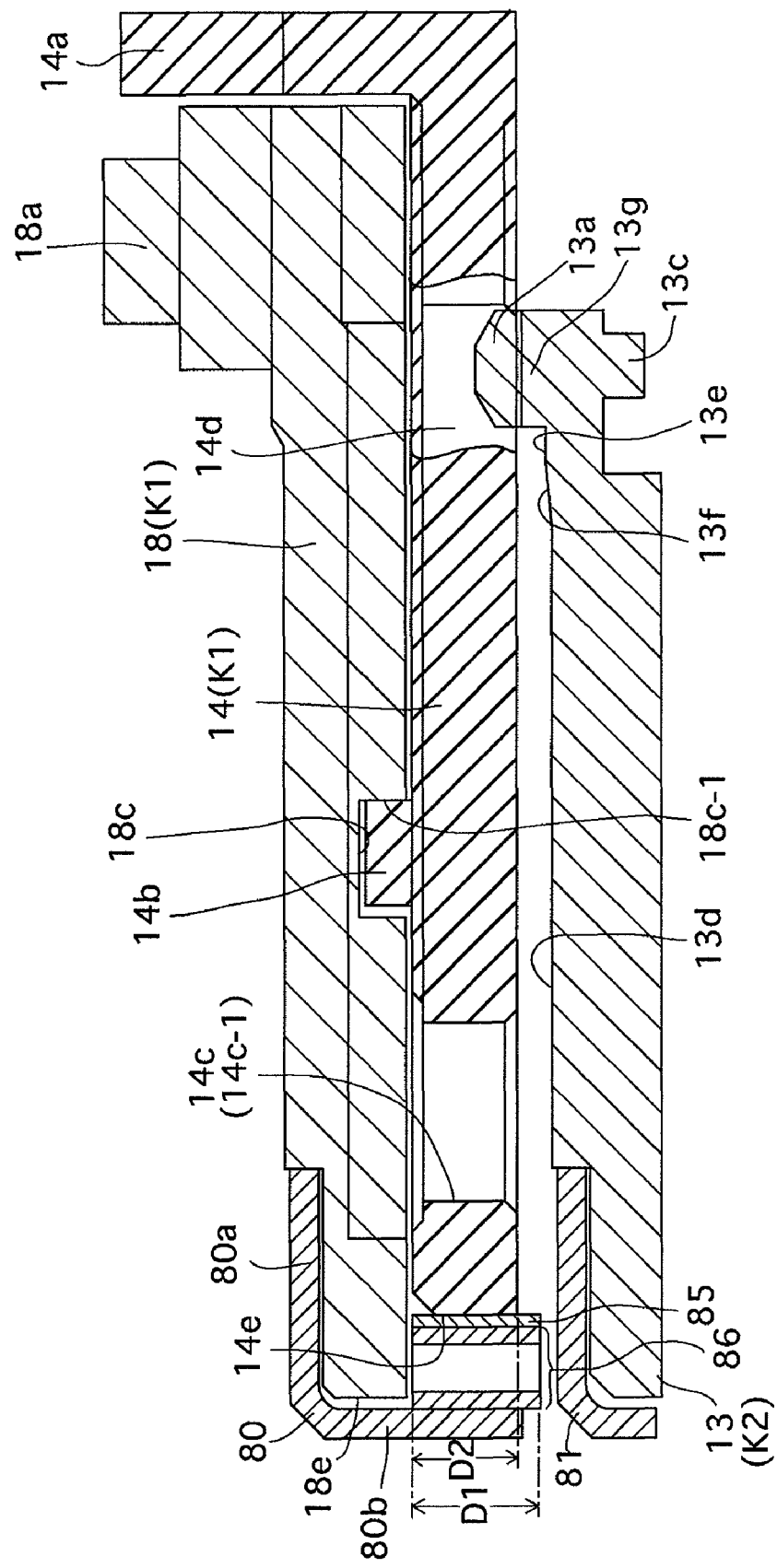
FIG. 7 is an enlarged cross sectional view of a portion of the zoom lens, showing a state of the light shielding structure in the fully-retracted state of the zoom lens.

When the zoom lens 71 is in the fully-retracted state, the second advancing barrel 13 is fully retracted into the first linear guide ring 14 as shown in FIG. 7, so that the amount of overlapping between the outer annular member K1 and the inner annular member K2 is maximum. When the zoom lens 71 moves to a ready-to-photograph state from the fully-retracted state, the inner annular member K2 (the second advancing barrel 13) moves forward in the optical axis direction relative to the outer annular member K1, which reduces the amount of overlapping between the outer annular member K1 and the inner annular member K2. In the ready-to-photograph state of the zoom lens 71, the outer annular member K1 and the inner annular member K2 are maintained at fixed positions in the optical axis direction, though the first advancing barrel 18 and the cam ring 11 rotate by the zoom motor 150 during a zooming operation. The zoom lens 71 is provided with a light shielding structure (which will be discussed hereinafter) between the outer annular member K1 and the inner annular member K2, which move relative to each other in the optical axis direction only during the transitional state between the fully-retracted state and the ready-to-photograph state of the zoom lens 71.

Figure 8:
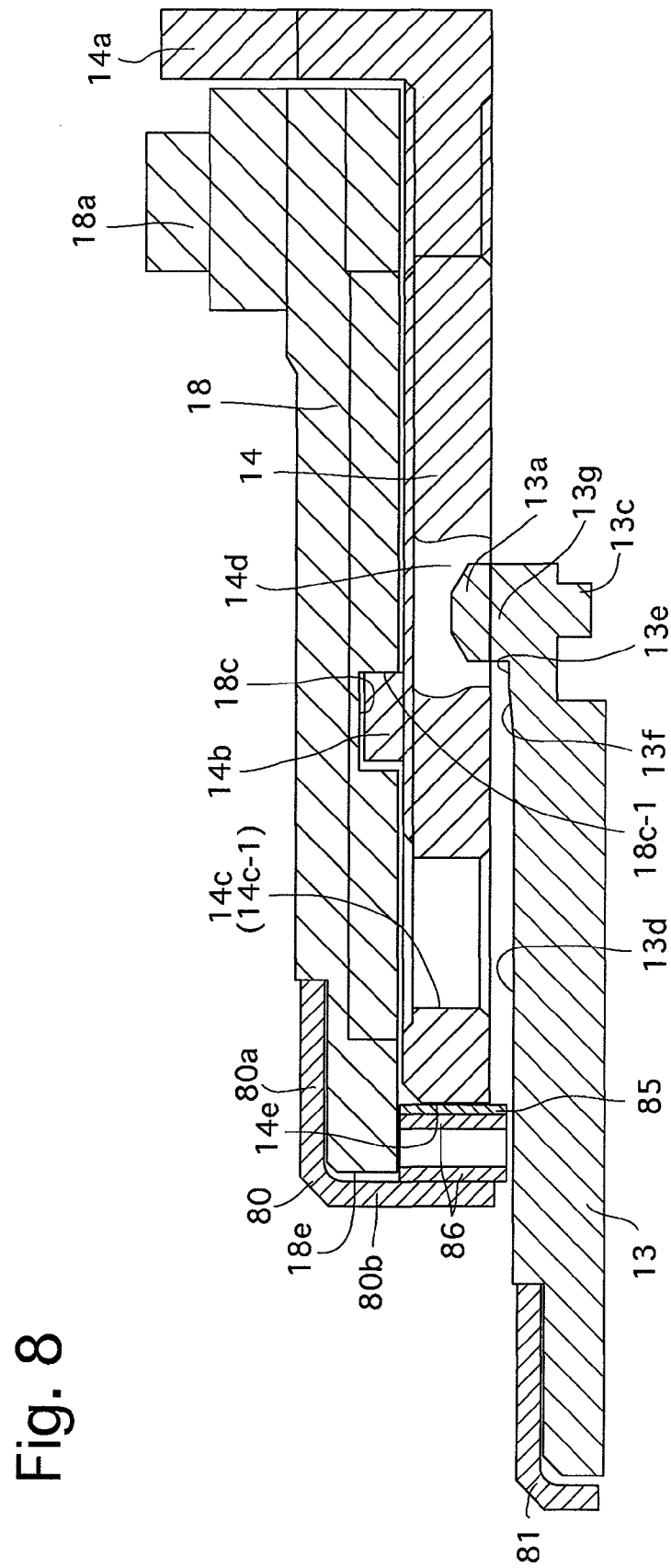
FIG. 8 is an enlarged cross sectional view of the portion of the zoom lens shown in FIG. 7, showing a transitional state of the zoom lens from the fully-retracted state to a ready-to-photograph state.
Figure 9:
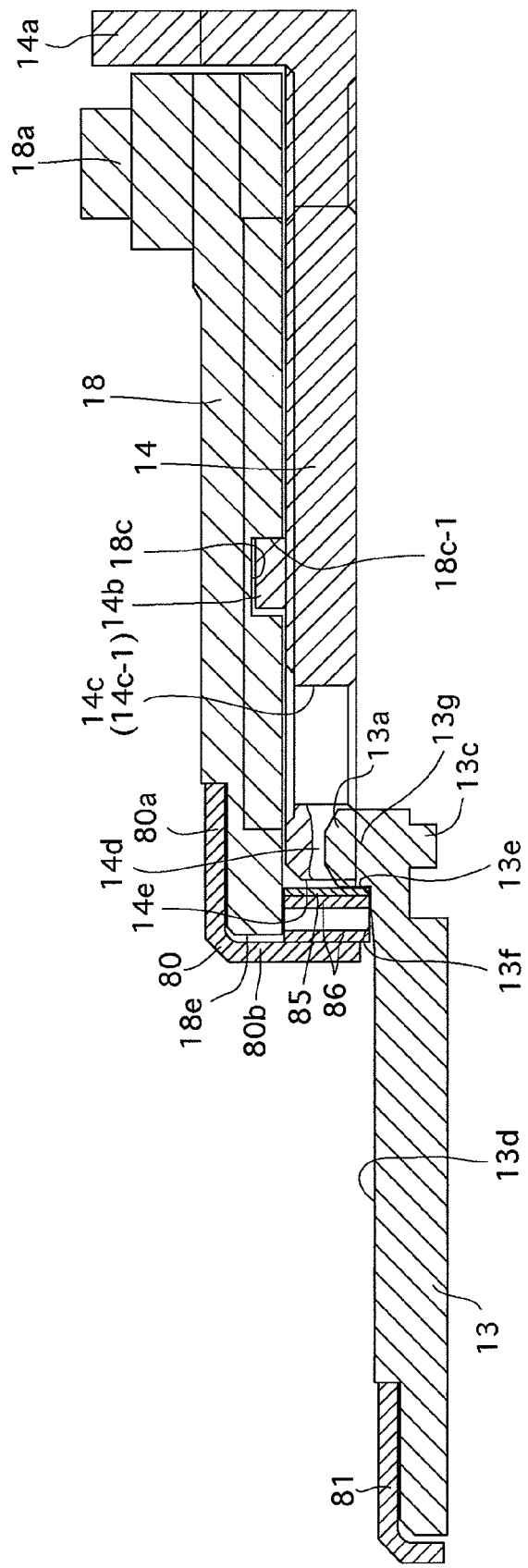
FIG. 9 is an enlarged cross sectional view of the portion of the zoom lens shown in FIG. 7, showing a state where the light shielding device is functioning.

As shown in FIGS. 7 through 9, the first advancing barrel 18 projects forward so that a front end surface 18e thereof is positioned in front of a front end surface 14e of the first linear guide ring 14 in the optical axis direction. The decorative ring 80 is formed in an L-shape in cross section, having an outer peripheral portion 80a and an inner flange portion 80b. The outer peripheral portion 80a extends circumferentially along an outer peripheral surface of the first advancing barrel 18, and the inner flange portion 80b extends radially inwards along the front end surface 18e. The outer peripheral portion 80a is fixed to the first advancing barrel 18 so that the decorative ring 80 rotates with the first advancing barrel 18. The inner flange portion 80b faces the front end surface (opposed end surface) 14e of the first linear guide ring 14 with a predetermined spacing (distance) between the inner flange portion 80b and the front end surface 14e in the optical axis direction. Namely, the zoom lens 71 is provided radially inside the outer annular member K1 with an annular space which is surrounded by an inner peripheral surface of the first advancing barrel 18, the inner flange portion 80b of the decorative ring 80 and the front end surface 14e of the linear guide ring and which is exposed radially inward (exposed toward an outer peripheral surface of the second advancing barrel 13). The zoom lens 71 is provided in this annular space with a light shielding ring 85 and a ring spring 86 which are supported by the first linear guide ring 14, the first advancing barrel 18 and the decorative ring 80. The light shielding ring 85 is a flat ring which lies in a plane orthogonal to the axes of the outer annular member K1 and the inner annular member K2 (i.e., orthogonal to the imaging optical axis Z1). As shown in FIG. 7, a radial width D1 of the light shielding ring 85 in a radial direction orthogonal to the axes of the outer annular member K1 and the inner annular member K2 is greater than a thickness D2 of the first linear guide ring 14 as shown in FIG. 7, so that the inner edge (radially inner portion) of the light shielding ring 85 projects radially inwards with respect to the inner peripheral surface of the first linear guide ring 14. The ring spring 86 is a metal annular wave spring, like a wave spring washer, which is formed to lie in a plane orthogonal to the axes of the outer annular member K1 and the inner annular member K2. The ring spring 86 is inserted in between the inner flange 80b of the decorative ring 80 and the light shielding ring 85 in a compressed state in the optical axis direction. The ring spring 86 brings the light shielding ring 85 into pressing contact with the front end surface 14e of the first linear guide ring 14.

The second advancing barrel 13 that constitutes a part of the inner annular member K2 is provided with a small diameter portion (small-diameter outer peripheral portion) 13d, a large diameter portion (large-diameter outer peripheral portion/diameter expansion portion) 13e and a diameter varying portion (tapered outer peripheral portion) 13f provided between the small diameter portion 13d and the large diameter portion 13e. The small diameter portion 13d is constant in outer diameter and provided immediately behind the decorative ring 81 that is provided at the front end of the second advancing barrel 13 so as to constitute the major part of the second advancing barrel 13 in the optical axis direction. The large diameter portion 13e is greater in outer diameter than the small diameter portion 13d and positioned immediately in front of the plurality of radial projections 13a. The diameter varying portion 13*f* gradually increases in diameter in a direction from the small diameter portion 13*d* toward the large diameter portion 13*e*. A radial clearance is formed between the outer peripheral surface of the second advancing barrel 13 and the inner peripheral surface of the first linear guide ring 14. This clearance is large at the small diameter portion 13*d* and narrow at the large diameter portion 13*e*. In addition, the second advancing barrel 13 is provided at the rear end of the large diameter portion 13*e* with an annular flange portion 13*g* which projects radially outwards to be greater in diameter than the large diameter portion 13*e*. The plurality of linear guide projections 13*a* that guide the second advancing barrel 13 linearly in the optical axis direction project radially outward from the outer peripheral surface of the annular flange portion 13*g*. Additionally, the decorative ring 81 provided at the front end of the second advancing barrel 13 is slightly smaller in outer diameter than the small diameter portion 13*d*, and a radial clearance is also formed between the outer peripheral surface of the decorative ring 81 and the inner peripheral surface of the first linear guide ring 14. On the other hand, the inner diameter of the light shielding ring 85 is determined so that the inner edge of the light shielding ring 85 can come in contact with the large diameter portion 13*e* (like in the state shown in FIG. 9) and does not come in contact with either the decorative ring 81 or the small diameter portion 13*d*.

As shown in FIG. 7, in the fully-retracted state of the zoom lens 71, the outer annular member K1 and the inner annular member K2 are positioned relative to each other in the optical axis direction in a manner such that the light shielding ring 85 and the ring spring 86 are positioned radially outside the decorative ring 81 in the same axial range thereof. As described above, the inner diameter of the light shielding ring 85 is greater than the outer diameter of the decorative ring 81, and a radial clearance exists between the inner edge of the light shielding ring 85 and the outer peripheral portion of the decorative ring 81, so that the light shielding ring 85 is not in contact with the decorative ring 81.

As shown in FIG. 8, in the transitional state of the zoom lens 71 between the fully-retracted state and the ready-to-photograph state, the outer annular member K1 and the inner annular member K2 are positioned relative to each other in the optical axis direction in a manner such that the light shielding ring 85 and the ring spring 86 pass along the radially outer side of the small diameter portion 13*d* of the second advancing barrel 13. As described above, the inner diameter of the light shielding ring 85 is greater than the outer diameter of the small diameter portion 13*d*, and even in this transitional state of the zoom lens 71 between the fully-retracted state and the ready-to-photograph state, a radial clearance exists between the inner edge of the light shielding ring 85 and the outer peripheral portion of the small diameter portion 13*d*, so that the light shielding ring 85 is not in contact with the small diameter portion 13*d*. Namely, until the moment immediately before the zoom lens 71 comes into the ready-to-photograph state from the fully-retracted state, the light shielding ring 85 does not come in contact with the outer peripheral surface of the second advancing barrel 13, so that no sliding frictional resistance is produced between the light shielding ring 85 and the second advancing barrel 13 when the outer annular member K1 and the inner annular member K2 move relative to each other in the optical axis direction. Accordingly, load on the zoom motor 150 can be lightened. In addition, since the light shielding member 85 does not come into sliding contact with the outer periphery of the second advancing barrel 13, there is a greatly reduced possibility of fine scuffing being made on the outer periphery of the second advancing barrel 13, so that a high quality of the outward appearance of the second advancing barrel 13 is maintained. Note that, during the time until the zoom lens 71 reaches the ready-to-photograph state from the fully-retracted state, there is practically no problem with any deterioration in optical performance occurring even if a relatively large clearance exists between the inner edge of the light shielding ring 85 and the small diameter portion 13*d* of the second advancing barrel 13 since no photographing operations can be performed during this time.

Figure 10:
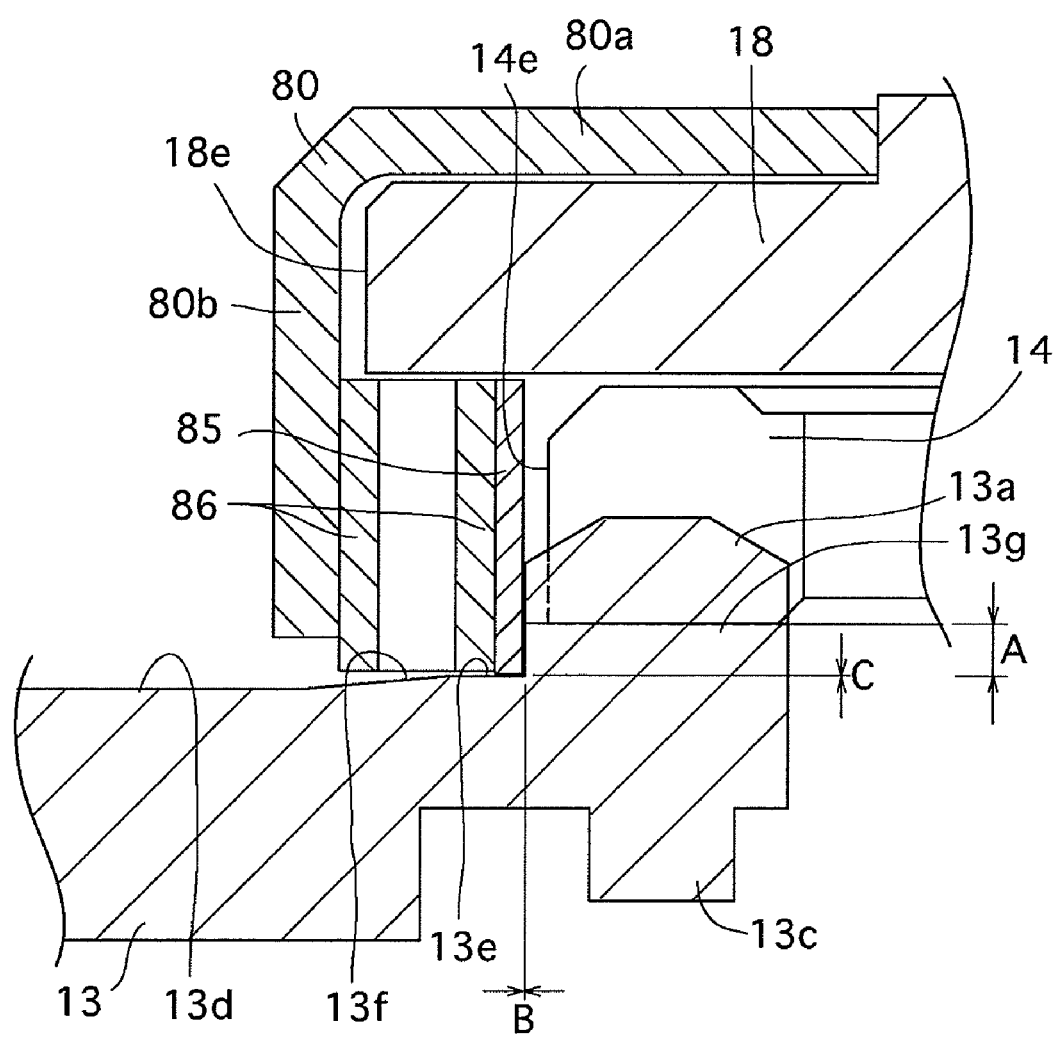
FIG. 10 is a further enlarged cross sectional view of a portion of the light shielding device shown in FIG. 9 in the vicinity of the light shielding ring thereof.

As shown in FIGS. 9 and 10, when the zoom lens 71 has moved to the ready-to-photograph state of the zoom lens 71, the inner annular member K2 is fully advanced forward relative to the outer annular member K1 in the optical axis direction, and thereupon, the light shielding ring 85 is positioned radially outside, and in the same axial range of, the large diameter portion 13*e* of the second advancing barrel 13. In this state, the inner edge of the light shielding ring 85 is in contact with the large diameter portion 13*e* to close the radial space between the second advancing barrel 13 and the first linear guide ring 14 to thereby shield rays of light which would otherwise pass through the radial space and subsequently enter the zoom lens 71. More specifically, a portion of the light shielding ring 85 at the inner edge thereof and the annular flange portion 13*g* overlap in radial directions, and the distance between the light shielding ring 85 and the annular flange 13*g* in the optical axis direction is reduced. Thereupon, the amount of overlapping (represented by "A" in FIG. 10) between the light shielding ring 85 and the annular flange portion 13*g* in radial direction is made greater than the axial distance (represented by "B" in FIG. 10) between the light shielding ring 85 and the annular flange portion 13*g* in the optical axis direction (i.e., A>B), which efficiently makes a clearance between the second advancing barrel 13 and the first linear guide ring 14 light-tight. More specifically, in the ready-to-photograph state shown in FIG. 10, the axial distance (B) between the light shielding ring 85 and the annular flange portion 13*g* in the optical axis direction is equal to zero because the annular flange portion 13*g* comes in contact with the light shielding ring 85 and presses the same forward. Additionally, in the ready-to-photograph state, the radial distance (represented by "C" in FIG. 10) between the inner edge of the light shielding ring 85 and the outer peripheral surface of the second advancing barrel 13 is also equal to zero (i.e., A>C) because the inner edge of the light shielding ring 85 comes in contact with the large diameter portion 13*e*.

Accordingly, the light shielding ring 85 functions as a light shielding device only upon the zoom lens 71 moving to the ready-to-photograph state. When the zoom lens 71 advances from the transitional state where the light shielding ring 85 is not in contact with the small diameter portion 13*d* of the second advancing barrel 13 to the ready-to-photograph state where the light shielding ring 85 is in contact with the large diameter portion 13*e*, the second advancing barrel 13 can advance smoothly, without the light shielding ring 85 getting caught (temporarily stick) on the second advancing barrel 13, via the formation of the diameter varying portion 13*f*.

In the ready-to-photograph state of the zoom lens 71, the first advancing barrel 18, which constitutes a part of the outer annular member K1, and the cam ring 11, which constitutes a part of the inner annular member K2, are rotated together in accordance with a focal-length changing operation (zooming operation) performed by an operation of the zoom motor 150, while the relative position between the outer annular member K1 and the inner annular member K2 does not change. Accordingly, while being the ready-to-photograph state, the light shielding structure is maintained in a light-tight state in which the inner edge of the light shielding ring 85 is in contact with the large diameter portion 13e and the light shielding ring 85 is positioned close to (immediately front) the annular flange portion 13g in the optical axis direction.

As described above, the light shielding structure provided between the outer annular member K1 and the inner annular member K2 is configured so that the light shielding ring 85, which is supported inside the outer annular member K1, comes in contact with the large diameter portion 13e (large-diameter outer peripheral portion) of the inner annular member K2 to prevent harmful light from entering inside the zoom lens 71 through a clearance between the outer annular member K1 and the inner annular member K2 only when the zoom lens 71 is in the ready-to-photograph state (operating state) and so that the light shielding ring 85 is not in contact with the decorative ring 81 and the small diameter portion 13d of the inner annular member K2 when the zoom lens 71 is in a non-operating state (i.e., the fully-retracted state and the transitional state). Due to this configuration, sliding frictional resistance does not continuously occur during relative movement between the outer annular member K1 and the inner annular member K2, which makes it possible to reduce the extension/retraction load on the zoom lens 71 and to prevent fine scuffing on the outer peripheral surface of the inner annular member K2 which may be caused by the sliding operation of the inner annular member K2 relative to the outer annular member K1.

The ring spring 86 can hold the light shielding ring 85 on the outer annular member K1 and also can remove backlash in the optical axis direction between the plurality of relative rotation guide projections 14b of the first linear guide ring 14 (which is an element of the outer annular member K1) and the circumferential groove 18c of the first advancing barrel 18 (which is an element of the outer annular member K1). As shown in FIGS. 7 through 9, the plurality of relative rotation guide projections 14b are loosely engaged in the circumferential groove 18c with some play in the optical axis direction. The ring spring 86 presses the light shielding ring 85 rearward against the front end surface 14e of the first linear guide ring 14, and at the same time the reaction force produced thereby presses the inner flange portion 80b of the decorative ring 80 forward, thus pressing the first advancing barrel 18 forward via the decorative ring 80. This causes a rear annular surface 18c-1 (slide contact surface) of the pair of axially-opposed annular surfaces in the circumferential groove 18c to be pressed against the plurality of relative rotation guide projections 14b of the first linear guide ring 14 to thereby prevent backlash and play between each relative rotation guide projection 14b and the circumferential groove 18c from occurring.

The light shielding structure of the zoom lens 71 is configured so that the spring force of the ring spring 86 in the ready-to-photograph state becomes greater than that in the fully-retracted state of the zoom lens 71 and that in the transitional state of the zoom lens 71. The light shielding ring 85 remains in contact with the front end surface 14e of the first linear guide ring 14 until the zoom lens 71 moves to (arrives at) the ready-to-photograph state as shown in FIGS. 7 and 8; however, once the zoom lens 71 comes into the ready-to-photograph state, the plurality of radial projections 13a and the annular flange portion 13g of the second advancing barrel 13 slightly project forward from the front end openings of the plurality of linear guide grooves 14d to press the light shielding ring 85 forward, in a direction away from the front end surface 14e, to thereby compress the ring spring 86 in the optical axis direction. This compression of the ring spring 86 increases the pressing force which presses the rear annular surface 18c-1 of the circumferential groove 18c against the plurality of relative rotation guide projections 14b. In the ready-to-photograph state of the zoom lens 71, this increased pressing force is effective at enhancing the effect of removing backlash with the ring spring 86 since the first linear guide ring 14 and the first advancing barrel 18 are required to be positioned with a high degree of accuracy. On the other hand, in the transition state, the biasing force of the ring spring 86 can be weakened until the zoom lens 71 moves to a ready-to-photograph state from the fully-retracted state, since a degree of accuracy like that required during a photographing operation is not required. In fact, it is desirable that the biasing force of the ring spring 86 be weakened so as to reduce the load on the zoom motor 150.

Figure 11:
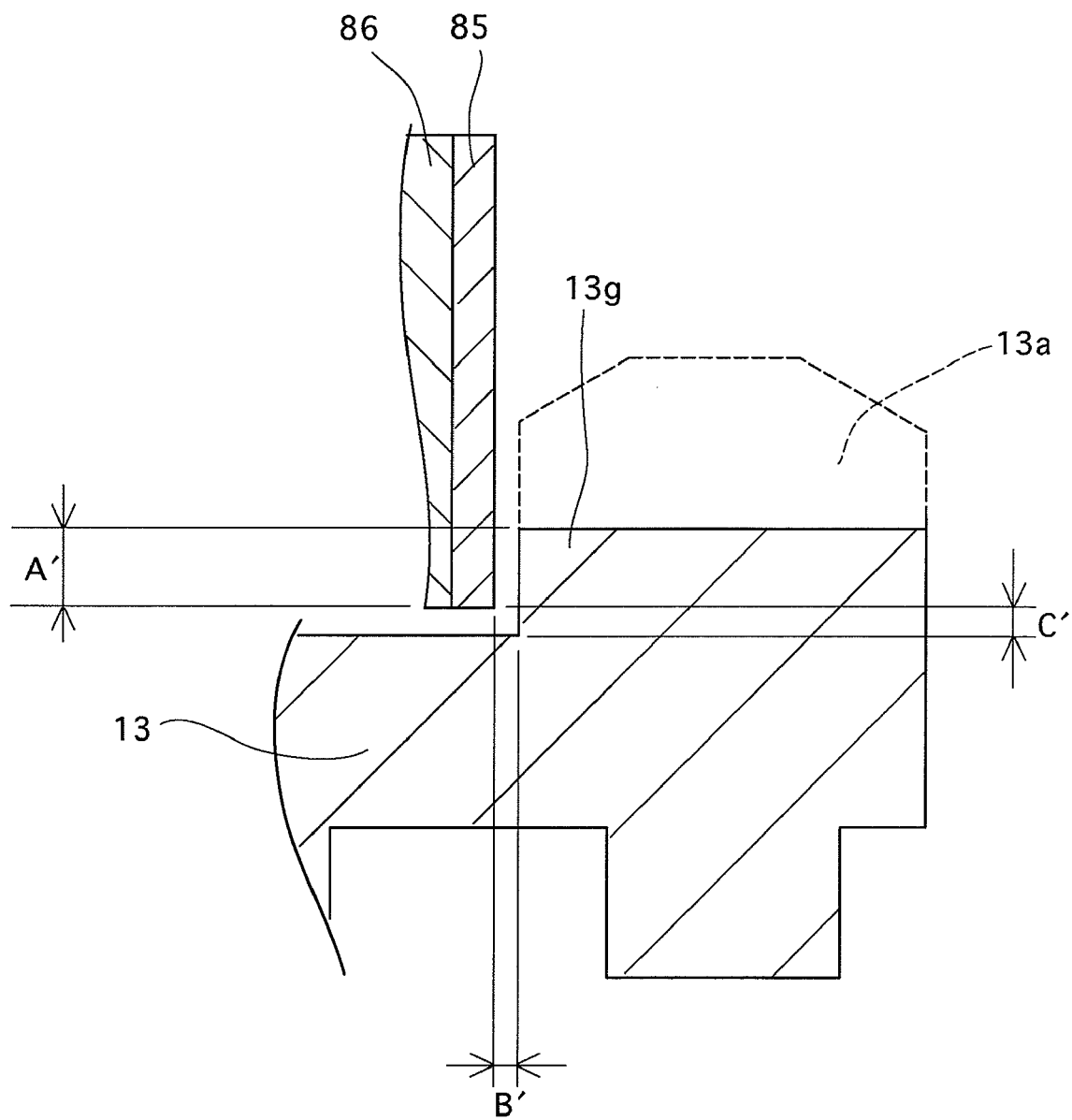
FIG. 11 is a further enlarged cross sectional view showing another embodiment of the light shielding structure in which the light shielding ring is not in contact with either the outer peripheral surface or an annular flange portion of the inner annular member (second advancing barrel).

As described the above, in the ready-to-photograph state shown in FIG. 10, the light shielding ring 85 comes into contact with both the large diameter portion 13e and the annular flange portion 13g of the second advancing barrel 13 (i.e., the axial distance B=0 and the radial distance C=0). However, even if the axial distance (B) and the radial distance (C) is slightly greater than zero, the light shielding structure is still effective, as shown in FIG. 11 that shows another embodiment of the light shielding structure. As the conditions therefor, the amount of overlapping (represented by "A'" in FIG. 11) between the light shielding ring 85 and the annular flange portion 13g in radial directions only needs to be greater than the axial distance (represented by "B'" in FIG. 11) between the light shielding ring 85 and the annular flange portion 13g in the optical axis direction (i.e., A'>B'). In addition, a more desirable light shielding effect can be obtained if the amount of overlapping (A') is greater than the radial distance (represented by "C'" in FIG. 11) between the inner edge of the light shielding ring 85 and the outer peripheral surface of the second advancing barrel 13 (i.e., A'>C').

The specific structures of the above described embodiments of the light shielding structures are merely examples which embody the present invention, so that the spirit and scope of the present invention are not limited by the above described embodiments.

For instance, the outer annular member K1 is composed of a combination of the first advancing barrel 18 and the first linear guide ring 14 that can rotate relative to each other, and an annular space for accommodating the light shielding ring 85 and the ring spring 86 is formed by this combination together with the inner flange portion 80b of the decorative ring 80 in the above described embodiments; however, it is possible that the first advancing barrel 18 and the decorative ring 80 be previously molded as a single-piece member. Alternatively, it is possible that an annular groove be formed on the inner peripheral surface of the first linear guide ring 14 to be used as an annular space for accommodating the light shielding ring 85 and the ring spring 86. However, from the viewpoint of workability of assembling operation, there is the advantage of the light shielding ring 85 and the ring spring 86 being easily installed if the decorative ring 80 is formed as an independent member that can be fixed afterward, just like in the above described embodiments.

In addition, although the light shielding ring 85 is supported by the outer annular member K1 (first linear guide ring 14) and the annular flange portion 13g is provided on the inner annular member K2 (the second advancing barrel 13) in the above described embodiments, it is possible for the outer annular member K1 to be provided with an annular flange portion which corresponds to the annular flange portion 13g and the inner annular member K2 is provided with a light shielding ring which corresponds to the light shielding ring 85 while satisfying the above-mentioned relationships A(A')>B(B') or A(A')>C(C')).

In addition, although the inner annular member K2 is composed of a number of combined members such as the second advancing barrel 13 and the cam ring 11 in the above illustrated embodiments, it is possible that the inner annular member be made of a single-piece member in a manner similar to the case of the outer annular member K1.

The spring member that holds the light shielding ring 85 is the annular waveform ring spring 86 that is simple in structure and superior in space saving. However, it is possible for a compression spring be used instead of the ring spring 86.

Additionally, although the present invention is applied to a light shielding structure provided between the first telescopic stage, which is the largest in diameter among the three concentric barrels of the telescopic type zoom lens 71, and the second telescopic stage in the above illustrated embodiments of the light shielding structures, the present invention can also be applied to a light shielding structure provided at an alternative location.

Although each of the above described embodiments of the light shielding structures is applied to a zoom lens, the present invention can also be applied to a fixed-focal-length type of retractable lens as long as it can move between a ready-to-photograph state (lens barrel advanced state) and a retracted state.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A light shielding structure of an optical device comprising:
    an outer annular member and an inner annular member which move relative to each other in an axial direction, said outer annular member being concentrically positioned outside said inner annular member;
    a small-diameter outer peripheral portion and a large-diameter outer peripheral portion which are formed on said inner annular member at different positions to each other in said axial direction, said large-diameter outer peripheral portion being greater in diameter than said small-diameter outer peripheral portion; and
    a light shielding ring positioned inside said outer annular member and supported thereby, wherein said light shielding ring creates a clearance with said small-diameter outer peripheral portion of said inner annular member,
    wherein said light shielding ring and said large-diameter outer peripheral portion of said inner annular member face each other along said axial direction in a ready-to-photograph state of said optical device such that the clearance between said outer annular member and said inner annular member is made light-tight, and
    wherein said light shielding ring and said small-diameter outer peripheral portion of said inner annular member face each other along substantially an entire range of motion in the axial direction of said outer annular member and said inner annular member between the ready-to-photograph state and a retracted state of said optical device in which said clearance does not need to be made light-tight.

2. The light shielding structure according to claim 1, wherein said inner annular member comprises an annular flange portion formed on an outer peripheral surface of said inner annular member at a position different from said small-diameter outer peripheral portion and said large-diameter outer peripheral portion in said axial direction, said annular flange portion being greater in diameter than said large-diameter outer peripheral portion,
    wherein said annular flange portion and said light shielding ring overlap in radial directions, and
    wherein, in said ready-to-photograph state, an amount of overlapping between said light shielding ring and said annular flange portion in said radial directions is greater than a distance between said light shielding ring and said annular flange portion in said axial direction.

3. The light shielding structure according to claim 1, wherein said inner annular member comprises a tapered outer peripheral portion which is provided between said small-diameter outer peripheral portion and said large-diameter outer peripheral portion, said tapered outer peripheral portion gradually increasing in diameter in a direction from said small-diameter outer peripheral portion toward said large-diameter outer peripheral portion.

4. The light shielding structure according to claim 1, wherein said light shielding ring is supported in an annular space formed inside said outer annular member.

5. The light shielding structure according to claim 4, wherein said light shielding ring is formed into a flat ring member which lies in a plane orthogonal to axes of said inner annular member and said outer annular member, and
    wherein said light shielding structure further comprises a spring member for making said flat ring member held in said annular space.

6. The light shielding structure according to claim 5, wherein said spring member comprises an annular waveform spring.

7. The light shielding structure according to claim 6, wherein said outer annular member comprises:
    a first outer annular member having an inner flange portion; and
    a second outer annular member having an axially-opposed end surface which is opposed to said inner flange portion in said axial direction,
    wherein said light shielding ring and said spring member are held between said inner flange portion and said axially-opposed end surface.

8. The light shielding structure according to claim 7, wherein said first outer annular member and said second outer annular member are coupled to each other to be relatively rotatable by engagement of a circumferential groove about an axis of said outer annular member with at least one rotation guide projection which slidably engages in said circumferential groove, and
    wherein said spring member presses said rotation guide projection against a slide contact surface in said circumferential groove.

9. The light shielding structure according to claim 8, wherein, in said ready-to-photograph state, said annular flange portion presses said spring member so as to increase a pressing force thereof which urges said light shielding member to be pressed against said axially-opposed end surface.

10. The light shielding structure according to claim 7, wherein said inner flange portion is formed as an independent member which is fixed at a front end of said first outer annular member.

11. The light shielding structure according to claim 1, wherein said outer annular member and said inner annular member are elements of a lens barrel, and
wherein in said retracted state said inner annular member is retracted into said outer annular member.

12. The light shielding structure according to claim 11, wherein said lens group comprises at least one lens group positioned inside said inner annular member, and
wherein said inner annular member supports said lens group and is movable between said retracted state, in which said inner annular member is retracted in an axial direction into said outer annular member, and said ready-to-photograph state, in which said inner annular member advances in an axial direction from said outer annular member.

13. The light shielding structure according to claim 1, wherein the length of said small-diameter outer peripheral is greater in the axial direction than the length of said large-diameter outer peripheral portion.

14. A light shielding structure of an optical device comprising:
an outer annular member and an inner annular member which move relative to each other in an axial direction, said outer annular member being concentrically positioned outside said inner annular member;
a light shielding ring supported in an annular space formed inside said outer annular member to project radially inwards; and
an annular flange portion which is formed on an outer peripheral surface of said inner annular member to project radially outwards, said annular flange portion overlapping said light shielding ring in radial directions,
wherein, in an operating state of said optical device in which a clearance between said outer annular member and said inner annular member is to be made light-tight, an amount of said overlapping between said light shielding ring and said annular flange portion in said radial directions is greater than a distance between said light shielding ring and said annular flange portion in said axial direction.

15. The light shielding structure according to claim 14, wherein, in said operating state of said optical device, said amount of overlapping between said light shielding ring and said annular flange portion in said radial directions is greater than a radial distance between a radially inner edge of said light shielding ring and an outer peripheral surface of said inner annular member.

16. A light shielding structure of an optical device comprising:
an outer annular member and an inner annular member which move relative to each other in an axial direction, said outer annular member being concentrically positioned outside said inner annular member;
an annular flange portion which is formed on one of said inner annular member and said outer annular member; and
a light shielding ring which is supported by the other of said inner annular member and said outer annular member;
wherein said annular flange portion and said light shielding ring project in an annular space between said outer annular member and said inner annular member so as to overlap each other in radial directions,
wherein, in an operating state of said optical device in which a clearance between said outer annular member and said inner annular member is to be made light-tight, an amount of said overlapping between said light shielding ring and said annular flange portion in said radial directions is greater than a distance between said light shielding ring and said annular flange portion in said axial direction.

17. A light shielding structure of an optical device comprising:
an outer annular member and an inner annular member which move relative to each other in an axial direction, said outer annular member being concentrically positioned outside said inner annular member;
a small-diameter outer peripheral portion and a large-diameter outer peripheral portion which are formed on said inner annular member at different positions to each other in said axial direction, said large-diameter outer peripheral portion being greater in diameter than said small-diameter outer peripheral portion; and
a light shielding ring positioned inside said outer annular member and supported thereby, wherein said light shielding ring does not contact at least said small-diameter outer peripheral portion of said inner annular member,
wherein positions of said light shielding ring and said large-diameter outer peripheral portion of said inner annular member coincide with each other in said axial direction in an operating state of said optical device whereby a clearance between said outer annular member and said inner annular member is made light-tight,
wherein positions of said light shielding ring and said small-diameter outer peripheral portion of said inner annular member coincide with each other in said axial direction in a non-operating state of said optical device in which said clearance does not need to be made light-tight,
wherein said inner annular member comprises an annular flange portion formed on an outer peripheral surface of said inner annular member at a position different from said small-diameter outer peripheral portion and said large-diameter outer peripheral portion in said axial direction, said annular flange portion being greater in diameter than said large-diameter outer peripheral portion,
wherein said annular flange portion and said light shielding ring overlap in radial directions, and
wherein, in said operating state, an amount of overlapping between said light shielding ring and said annular flange portion in said radial directions is greater than a distance between said light shielding ring and said annular flange portion in said axial direction.

18. A light shielding structure of an optical device comprising:
an outer annular member and an inner annular member which move relative to each other in an axial direction, said outer annular member being concentrically positioned outside said inner annular member;
a small-diameter outer peripheral portion and a large-diameter outer peripheral portion which are formed on said inner annular member at different positions to each other in said axial direction, said large-diameter outer peripheral portion being greater in diameter than said small-diameter outer peripheral portion; and
a light shielding ring positioned inside said outer annular member and supported thereby, wherein said light shielding ring does not contact at least said small-diameter outer peripheral portion of said inner annular member,
wherein positions of said light shielding ring and said large-diameter outer peripheral portion of said inner annular member coincide with each other in said axial direction in an operating state of said optical device whereby a clearance between said outer annular member and said inner annular member is made light-tight, and wherein positions of said light shielding ring and said small-diameter outer peripheral portion of said inner annular member coincide with each other in said axial direction in a non-operating state of said optical device in which said clearance does not need to be made light-tight, and wherein said inner annular member comprises a tapered outer peripheral portion provided between said small-diameter outer peripheral portion and said large-diameter outer peripheral portion, said tapered outer peripheral portion gradually increasing in diameter in a direction from said small-diameter outer peripheral portion toward said large-diameter outer peripheral portion.

* * * * *